(12) United States Patent
Xu et al.

(10) Patent No.: US 9,135,168 B2
(45) Date of Patent: Sep. 15, 2015

(54) APPARATUS AND METHOD FOR GENERATING DESCRIPTORS TO REACCESS A NON-VOLATILE SEMICONDUCTOR MEMORY OF A STORAGE DRIVE DUE TO AN ERROR

(71) Applicant: Marvell World Trade Ltd., St. Michael (BB)

(72) Inventors: Wei Xu, Milpitas, CA (US); Fei Sun, Irvine, CA (US)

(73) Assignee: Marvell World Trade Ltd., Hamilton (BM)

( * ) Notice: Subject to any disclaimer, the term of this patent is extended or adjusted under 35 U.S.C. 154(b) by 0 days.

(21) Appl. No.: 14/208,814

(22) Filed: Mar. 13, 2014

(65) Prior Publication Data

US 2014/0195727 A1 Jul. 10, 2014

Related U.S. Application Data

(63) Continuation-in-part of application No. 14/132,810, filed on Dec. 18, 2013, which is a continuation-in-part of application No. 13/166,340, filed on Jun. 22, 2011, now Pat. No. 8,868,852.

(Continued)

(51) Int. Cl.
*G06F 12/02* (2006.01)
*G06F 11/10* (2006.01)
*G06F 13/16* (2006.01)
*G06F 11/14* (2006.01)

(52) U.S. Cl.
CPC ........ *G06F 12/0246* (2013.01); *G06F 11/1008* (2013.01); *G06F 11/14* (2013.01); *G06F 11/141* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 4,611,278 A | 9/1986 | Boothroyd et al. | |
| 5,649,139 A | 7/1997 | Weinreb et al. | |

(Continued)

FOREIGN PATENT DOCUMENTS

| | | |
|---|---|---|
| CN | 101025720 A | 8/2007 |
| EP | 0305987 A2 | 3/1989 |

(Continued)

OTHER PUBLICATIONS

Webopedia, "Instruction", Apr. 5, 2001, pp. 1-2, https://web.archive.org/web/20010405165609/http://www.webopedia.com/TERM/I/instruction.html.*

(Continued)

*Primary Examiner* — Edward Dudek, Jr.
*Assistant Examiner* — Christopher D Birkhimer

(57) ABSTRACT

A storage drive including a first module and a second module. The first module is configured to, based on an instruction signal of a first descriptor, transfer a block of data to or from a non-volatile semiconductor memory in the storage drive. The second module is configured to: monitor a status of the transfer of the block of data; determine whether an error exists with respect to the transfer of the block of data; and independent of communication with a host device, initiate generation of a second descriptor if the error exists. The second module is configured to, according to the second descriptor, perform a reaccess event including reaccessing the non-volatile semiconductor memory to again transfer the block of data to or from the non-volatile semiconductor memory.

22 Claims, 11 Drawing Sheets

Related U.S. Application Data

(60) Provisional application No. 61/794,092, filed on Mar. 15, 2013, provisional application No. 61/900,104, filed on Nov. 5, 2013, provisional application No. 61/739,386, filed on Dec. 19, 2012, provisional application No. 61/362,251, filed on Jul. 7, 2010.

(56) References Cited

U.S. PATENT DOCUMENTS

| | | | |
|---|---|---|---|
| 5,987,573 | A | 11/1999 | Hiraka |
| 6,493,818 | B2 | 12/2002 | Robertson |
| 6,795,872 | B2 | 9/2004 | Page et al. |
| 6,895,408 | B1* | 5/2005 | Kavantzas .......................... 1/1 |
| 6,943,973 | B1* | 9/2005 | Nunomura et al. ............. 360/53 |
| 7,007,140 | B2 | 2/2006 | Yoshi et al. |
| 7,054,990 | B1 | 5/2006 | Tamura et al. |
| 7,155,560 | B2 | 12/2006 | McGrew et al. |
| 7,313,649 | B2 | 12/2007 | Tomita et al. |
| 7,363,441 | B2 | 4/2008 | Yim et al. |
| 7,406,576 | B2 | 7/2008 | Asauchi |
| 7,409,492 | B2 | 8/2008 | Tanaka et al. |
| 7,454,670 | B2 | 11/2008 | Kim et al. |
| 7,508,706 | B2 | 3/2009 | Tsuruda |
| 7,546,392 | B2 | 6/2009 | Castille et al. |
| 7,562,183 | B2 | 7/2009 | Kwon |
| 7,600,085 | B2 | 10/2009 | Yokota et al. |
| 7,600,090 | B2 | 10/2009 | Cohen et al. |
| 7,617,515 | B1 | 11/2009 | Laksono |
| 7,664,922 | B2 | 2/2010 | Ohtsuka et al. |
| 8,868,852 | B2 | 10/2014 | Lee et al. |
| 2004/0250009 | A1* | 12/2004 | Chen et al. .................... 711/103 |
| 2004/0268178 | A1* | 12/2004 | Fredin ................................ 714/6 |
| 2006/0004949 | A1* | 1/2006 | Van Steenwijk et al. ..... 711/103 |
| 2006/0149890 | A1 | 7/2006 | Gorobets |
| 2006/0161694 | A1 | 7/2006 | Tomozaki |
| 2007/0011396 | A1 | 1/2007 | Singh et al. |
| 2007/0091677 | A1 | 4/2007 | Lasser et al. |
| 2008/0082751 | A1 | 4/2008 | Okin et al. |
| 2008/0209112 | A1 | 8/2008 | Yu et al. |
| 2008/0209154 | A1* | 8/2008 | Schneider .................... 711/170 |
| 2008/0215802 | A1 | 9/2008 | Chow et al. |
| 2008/0222365 | A1 | 9/2008 | Szewerenko et al. |
| 2008/0320209 | A1 | 12/2008 | Lee et al. |
| 2009/0070520 | A1 | 3/2009 | Mizushima |
| 2009/0132755 | A1 | 5/2009 | Radke |
| 2009/0161429 | A1 | 6/2009 | Chen et al. |
| 2009/0172260 | A1 | 7/2009 | Olbrich et al. |
| 2009/0265506 | A1 | 10/2009 | Yim |
| 2011/0082985 | A1 | 4/2011 | Haines et al. |
| 2012/0011298 | A1 | 1/2012 | Lee et al. |
| 2012/0159052 | A1 | 6/2012 | Lee et al. |
| 2013/0024751 | A1 | 1/2013 | Yang |
| 2014/0108714 | A1 | 4/2014 | Lee et al. |
| 2015/0039817 | A1 | 2/2015 | Lee et al. |

FOREIGN PATENT DOCUMENTS

| | | |
|---|---|---|
| EP | 0578013 A1 | 1/1994 |
| WO | WO/2008/096968 | 8/2008 |
| WO | WO-2012006062 A1 | 1/2012 |
| WO | WO-2014100362 A1 | 6/2014 |
| WO | WO-2014144043 A1 | 9/2014 |

OTHER PUBLICATIONS

Webopedia, "Page", Apr. 11, 2001, pp. 1-2, https://web.archive.org/web/20010411032818/http://www.webopedia.com/TERM/p/page.html.*

Webopedia, "Error Detection", Aug. 9, 2002, pp. 1-2, https://web.archive.org/web/20020809135046/http://www.webopedia.com/TERM/E/error_detection.html.*

Notification of Transmittal of the International Search Report and the Written Opinion of the International Searching Authority, or the Declaration dated Sep. 30, 2011 in reference to PCT/US2011/042124.

International Search Report for PCT Application No. PCT/US2011/042124 mailed Sep. 30, 2011; 4 pages.

Written Opinion for PCT Application No. PCT/US2011/042124 mailed Sep. 30, 2011; 6 pages.

Webopedia, "Parallel", Aug. 15, 2002, pp. 1-2, https://web.archive.org/web/20020815175718/http://www.webopedia.com/TERM/P/parallel.html.

Webopedia, "RAID", Aug. 10, 2002, pp. 1-2, htlps://web.archive.org/web/20020810160048/http://www.webopedia.com/TERM/R/RAID.html.

Webopedia, Interrupt:, Aug. 6, 2002, pp. 1-2, https://web.arthive.org/web/20020806203437/http://www.webopedia.com/TERM/I/interrupt.html.

Webopedia, "Queue", Aug. 10, 2002, pp. 1-2, https://web.archive.org/web/20020810034508/http://www.webopedia.com/TERM/Q/queue.html.

International Search Report for PCT Application No. PCT/US2013/076437 mailed Mar. 27, 2014; 4 pages.

International Search Report for PCT Application No. PCT/US2014/028286 mailed Aug. 6, 2014; 4 pages.

Chinese Office Action for related Chinese Application No. 201180038435.X dated Feb. 15, 2015: 15 pages.

* cited by examiner

APPARATUS AND METHOD FOR GENERATING DESCRIPTORS TO REACCESS A NON-VOLATILE SEMICONDUCTOR MEMORY OF A STORAGE DRIVE DUE TO AN ERROR

CROSS-REFERENCE TO RELATED APPLICATIONS

The present disclosure is a continuation-in-part application of U.S. patent application Ser. No. 14/132,810 filed on Dec. 18, 2013. This application claims the benefit of U.S. Provisional Application No. 61/794,092, filed on Mar. 15, 2013. U.S. patent application Ser. No. 14/132,810 is a continuation-in-part Application of U.S. patent application Ser. No. 13/166,340 filed on Jun. 22, 2011. U.S. patent application Ser. No. 14/132,810 claims the benefit of U.S. Provisional Application No. 61/900,104, filed on Nov. 5, 2013, and U.S. Provisional Application No. 61/739,386, filed on Dec. 19, 2012. U.S. patent application Ser. No. 13/166,340 claims the benefit of U.S. Provisional Application No. 61/362,251, filed on Jul. 7, 2010. The disclosures of the above applications are incorporated herein by reference in their entirety.

FIELD

The present disclosure relates to non-volatile semiconductor memory access systems, and more particularly to data transfer control systems for non-volatile semiconductor memory.

FIELD

The present disclosure relates to non-volatile semiconductor memory access systems, and more particularly to data transfer control systems for non-volatile semiconductor memory.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A non-volatile semiconductor memory (NVSM) drive (e.g., a flash drive) includes NVSM and operates based on a size of a page of data. For example, data transferred to and from the NVSM is grouped into data sets. Each of the data sets has a length equal to the length of one or more pages of data. A page of data may have a length of, for example, 8 kilobytes (KB).

A NVSM drive can include, for example, an NVSM interface, a buffer managing module, an error correction code (ECC) module, an interface management module and a NVSM control module. The NVSM interface can communicate with a host. Data is transferred between the NVSM interface and the host. The buffer managing module receives data from the host prior to being stored in the NVSM and receives data from the NVSM prior to being transferred to the host. The ECC module encodes data provided to the NVSM and decodes data received from the NVSM. The interface management module controls data transfers between the ECC module and the NVSM.

The NVSM control module executes firmware to generate descriptors in response to access request signals received from the host. The descriptors may indicate, for example, whether a read operation or a program (i.e. write) operation is to be performed, the amount of data to be transferred, and the addresses to access in the NVSM. The ECC module and the interface management module are operated based on the descriptors.

The interface control module communicates with the NVSM via multiple channels (e.g., 8 channels per NVSM chip) and includes a first-in-first-out (FIFO) register for each of the channels. The FIFO registers are accessed sequentially during read and program operations. The size of each of the FIFO registers is equal to the size of one or more pages of data.

During a program operation, the ECC module can transfer data in a page-based format to the interface control module prior to being stored in the NVSM. The ECC module may transfer one or more pages (M pages) of data to each of the FIFO registers, where M is an integer greater than or equal to 1. The number of pages the ECC module transfers to each of the FIFO registers is dependent on the page format of that NVSM drive. For each set of M pages transferred a single descriptor can be generated.

For example, if the ECC module is operating in an NVSM drive with a single page format, 1 page of data is transferred to each of the FIFO registers. In this example, the size of each of the FIFO registers is equal to the size of 1 page of data. If the ECC module is operating in an NVSM drive with a dual page format, then 2 pages of data are transferred to each of the FIFO registers and the size of each of the FIFO registers is equal to the size of 2 pages of data. The M pages of data are transferred to a current FIFO register prior to transferring data to a next (or subsequent) FIFO register. The above-described data transfers are performed in reverse for a read operation.

Because data is not transferred to a next FIFO register until a current FIFO register receives the M pages of data, data transfer delays can result. These delays may be experienced at one or more of the FIFO registers and can increase with higher order page formats. The order of a page format refers to the number of pages transferred during a single data transfer event. A data transfer event refers to transferring data to or from one of the channels of the NVSM. For example, in a NVSM drive with a 2-page format, if a "bottleneck" arises at a first FIFO register due to speed differences between the ECC module and a first channel, delays can arise at the first FIFO register and at all subsequent FIFO registers. Since two pages of data are transferred to a single FIFO register, a second page of data can be delayed when a first page of data is delayed. Also, delays in transferring the second page of data to the first FIFO register delays transfers of data to FIFO registers subsequent to the first FIFO register.

In addition, data errors can occur during reading of data from the NVSM. A data error can occur, for example, due to use of an inaccurate voltage reference in the NVSM. State of memory cells in the NVSM are distinguishable based on voltage references. If the voltage references become inaccurate over time, interpretation of detected voltages corresponding to states of the memory cells can be inaccurate and as a result can cause data errors. To correct the data errors, the NVSM control module can execute firmware to generate descriptors to reread the memory cells having the corresponding data errors.

SUMMARY

A storage drive is provided and includes a first module and a second module. The first module is configured to, based on an instruction signal of a first descriptor, transfer a block of data to or from a non-volatile semiconductor memory in the storage drive. The second module is configured to: monitor a status of the transfer of the block of data; determine whether an error exists with respect to the transfer of the block of data; and independent of communication with a host device, initiate generation of a second descriptor if the error exists. The second module is configured to, according to the second descriptor, perform a reaccess event including reaccessing the non-volatile semiconductor memory to again transfer the block of data to or from the non-volatile semiconductor memory.

In other features, the storage drive further includes a third module and a fourth module. The third module is configured to, according to the first descriptor, generate a third descriptor to transfer the block of data between the first module and the non-volatile semiconductor memory. The fourth module is configured to generate the instruction signal in response to the second descriptor. The second module is configured to, based on execution of the third descriptor by the first module, monitor the status of the transfer of the block of data, determine whether the error exists with respect to the transfer of the block of data, and initiate the generation of the second descriptor if the error exists.

In other features, the third module is configured to: access a template; update fields in the template based on parameters in the first descriptor; and generate the second descriptor or the third descriptor according to the template.

In other features, the second module is configured to trigger the third module to generate reaccess descriptors corresponding respectively to multiple reaccess events for the block of data. The reaccess descriptors includes the second descriptor. The third module is configured to: access a template for each of the reaccess events, where each of the templates includes fields; update the fields in the templates based on the first descriptor; and generate the reaccess descriptors according to the templates.

In other features, the storage drive further includes a third module and a fourth module. The third module is configured to process data transferred between the first module and the non-volatile semiconductor memory and generate an indication signal if the error exists. The second module is configured to, based on the indication signal, generate a trigger signal to trigger the generation of the second descriptor. The fourth module is configured to generate the second descriptor based on the trigger signal.

In other features, the storage drive further includes a third module configured to set a maximum number of reaccess events for the block of data. The second module is configured to track a number of reaccess events performed for the block of data, trigger generation of reaccess descriptors corresponding respectively to the reaccess events performed for the block of data, and cease generation of reaccess descriptors if the number of reaccess events is equal to or greater than the maximum number of reaccess events. One of the reaccess descriptors generated for the reaccess events is the second descriptor.

In other features, a method is provided and includes: based on an instruction signal of a first descriptor, transferring a block of data to or from a non-volatile semiconductor memory in a storage drive; monitoring a status of the transfer of the block of data; determining whether an error exists with respect to the transfer of the block of data; and initiating generation of a second descriptor if the error exists. The method further includes, according to the second descriptor, performing a reaccess event including reaccessing the non-volatile semiconductor memory to again transfer the block of data to or from the non-volatile semiconductor memory.

In other features, the method further includes according to the first descriptor, generating a third descriptor to transfer the block of data to or from the non-volatile semiconductor memory. The instruction signal is generated in response to the second descriptor. Based on execution of the third descriptor, the status of the transfer of the block of data is monitored. The determination of whether the error exists with respect to the transfer of the block of data is performed. The generation of the second descriptor is initiated if the error exists.

In other features, the method further includes: accessing a template; updating fields in the template based on parameters in the first descriptor; and generating the second descriptor or the third descriptor according to the template.

In other features, the method further includes: triggering generation of reaccess descriptors corresponding respectively to reaccess events for the block of data, where the reaccess descriptors includes the second descriptor; accessing a template for each of the reaccess events, where each of the templates includes fields; updating the fields in the templates based on the first descriptor; and generating the reaccess descriptors according to the templates.

In other features, the method further includes: processing data transferred to or from the non-volatile semiconductor memory; generating an indication signal if the error exists; based on the indication signal, generating a trigger signal to trigger the generation of the second descriptor; and generating the second descriptor based on the trigger signal.

In other features, the method further includes: setting a maximum number of reaccess events for the block of data; tracking a number of reaccess events performed for the block of data; triggering generation of reaccess descriptors corresponding respectively to the reaccess events performed for the block of data, where one of the reaccess descriptors generated for the reaccess events is the second descriptor; and ceasing generation of reaccess descriptors if the number of reaccess events is equal to or greater than the maximum number of reaccess events.

In other features, the method further includes reporting: a pass for the block of data if the error no longer exists as a result of one of the reaccess events performed for the block of data clearing the error; and a pass or a failure for the block of data if the number of reaccess events performed for the block of data is equal to or greater than the maximum number of reaccess events.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

A NVSM control module can execute firmware to generate descriptors to read data from or write data to a NVSM. The NVSM control module can also generate descriptors to reaccess memory cells of the NVSM when data errors occur. The generating of descriptors to read, write and reaccess memory cells of the NVSM can require a large amount of firmware overhead and can utilize significant bandwidth and/or processing time of the NVSM control module. To reduce firmware overhead, bandwidth, and processing time associated with generating descriptors, examples are disclosed below that include generating descriptors via a reaccess module and/or hardware, which are separate from a NVSM control module. The reaccess module and/or hardware may include an electronic circuit or other suitable hardware for generating descriptors as described below. Although the following examples are primarily described as utilizing hardware for these purposes, the examples may include logic devices and/or a processor, which may execute additional firmware for descriptor generation. The reaccess module and/or hardware can generate descriptors to reaccess the NVSM without NVSM control module intervention.

In the following description, the term "non-volatile semiconductor memory (NVSM)" may refer to phase change memory (PCM), electrically erasable programmable read-only memory (EEPROM), read only memory (ROM) and/or random access memory (RAM). A couple of examples of EEPROM are NAND flash memory and NOR flash memory.

Also, in the following description the term "host" may refer to a device that transfers data to and/or accesses data from a NVSM drive. A NVSM drive may be a flash drive, a universal serial bus (USB) drive, a solid-state memory drive, etc.

As a few examples, a host may refer to a computer, a camera, a handheld device, a portable device, a cellular phone, a printer, a personal data assistant, an electronic note pad, a television, a display, an appliance, a monitoring system, etc. Examples of computers are a desktop computer, a laptop computer, an electronic note pad, etc. Examples of appliances are a washer, a dryer, a refrigerator, etc. A NVSM drive includes NVSM and may not include a rotating magnetic storage medium, such as a hard disk drive platter. Examples of monitoring systems include burglar monitors, smoke detection systems, baby monitors, etc.

In addition, various system elements, such as modules, network devices, and circuit components are disclosed herein. Examples of arrangements of the system elements are disclosed and include adjacent elements and non-adjacent elements. The adjacent elements are shown as being directly connected to each other. The non-adjacent elements are shown as being indirectly connected to each other.

Figure 1:
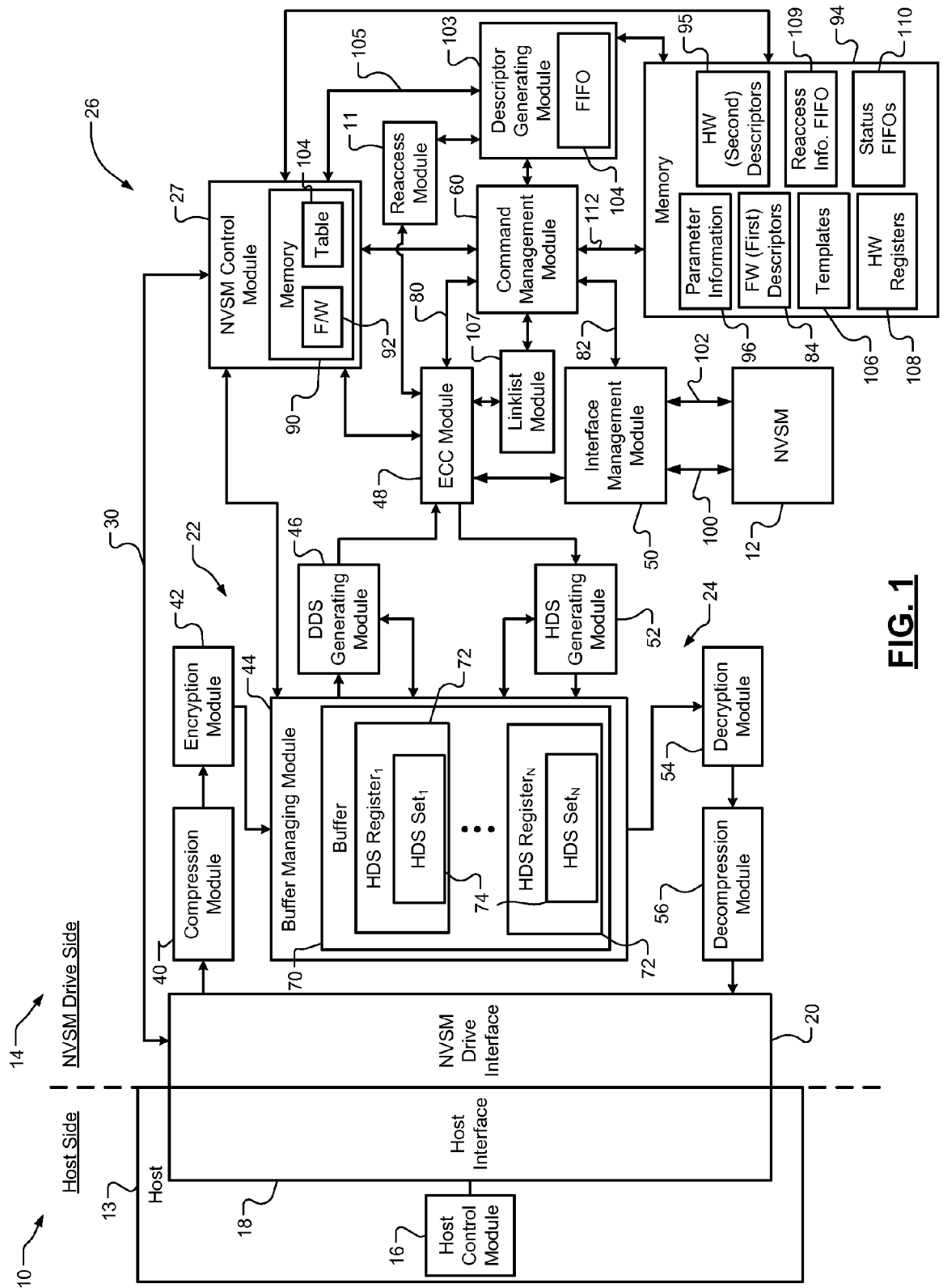
FIG. 1 is a functional block diagram of a NVSM storage system incorporating a reread module according to the present disclosure.

FIG. 1 shows a non-volatile semiconductor memory (NVSM) storage system 10. The NVSM system 10 includes a reaccess module 11, which is configured to generate descriptors to reaccess NVSM 12 as a result of errors that occur during access of the NVSM 12. Generation of the descriptors and operation of the NVSM system 10 are further described below.

The NVSM storage system 10 includes a host 13 (or host side) and a NVSM drive 14 (or NVSM side). The host 13 includes a host control module 16 and a host interface 18. The NVSM drive 14 communicates with the host 13 via a NVSM drive interface 20. The NVSM drive 14 includes the NVSM drive interface 20, a receive path 22, a transmit path 24, an interface management control system 26 and a NVSM 12. The NVSM drive interface 20 communicates with the host interface 18. The receive and transmit paths 22, 24 transfer data between the NVSM drive interface 20 and the NVSM 12. The interface management control system 26 includes a NVSM control module 27. The NVSM control module 27 controls data transfers to and from the NVSM 12.

The interface management control system 26 operates based on predetermined, selected, and/or determined size(s) of allocation blocks of data (or allocation units (AUs)). This is unlike traditional NVSM drives that operate based on a single fixed block size. In a traditional NVSM, the single block size is equal to the size of a page of data.

In the present disclosure, an allocation block of data refers to an amount of data (or size boundary) set by the NVSM drive 14 and used to transfer data between devices and/or modules of the NVSM drive 14. Each data transfer event to and from the NVSM 12 includes one or more allocation blocks of data. The data transfer events may be program events or read events. The sizes of the allocation blocks may be the same or different: for different read events; for different program events; and/or between read events and program events. The sizes of the allocation blocks may be determined, set and/or adjusted by the NVSM control module 27. Allocation blocks, allocation block sizes and the transfer of allocation blocks are further described below.

The host control module 16 transmits and receives host data to and from the NVSM drive 14 via the host interface 18. This may include access events such as read, write (or program), and/or erase access events. The host 13 may generate HDSs based on a received data object and/or request host data sectors (HDSs) from the NVSM drive 14. A HDS may be the smallest length data element that is transmitted from the host 13 to the NVSM drive 14. The HDSs are transmitted between respective ports of the interfaces 18, 20. The interfaces 18, 20 may be, for example, serial advanced technology attachment (SATA) interfaces, small computer system interfaces (SCSIs), serial-attached SCSIs (SASs), fiber channel interfaces, universal serial bus (USB) interfaces, etc.

The host control module 16 may also generate access request signals 30, such as data program signals, data read signals, data erase signals, etc. The access request signals 30 may be received by a NVSM control module 27 and/or by other modules of the NVSM drive 14 via the NVSM drive interface 20. The NVSM control module 27 controls access to the NVSM 12 based on the access request signals 30. The NVSM drive 14 receives the HDSs via the NVSM drive interface 20. The NVSM control module 27 may access and/or request drive data sectors (DDSs) from the NVSM 12 based on the access request signals 30.

The receive path 22 includes a compression module 40, an encryption module 42, a buffer managing module 44, a drive data sector (DDS) generating module 46, an error correction code (ECC) module 48, an interface management module 50 and the NVSM 12. The transmit path 24 includes the NVSM 12, the interface management module 50, the ECC module 48, a HDS generating module 52, the buffer managing module 44, a decryption module 54 and a decompression module 56. The buffer managing module 44 and the DDS and HDS generating modules 46, 52 may be combined to form a single module. The interface management control system 26 includes the NVSM control module 27, a command management module 60, the ECC module 48, and the interface management module 50. Modules of the NVSM drive 14 may be referred to as a NVSM storage system and may be combined into one or more modules.

The NVSM drive interface 20 may receive a single data stream or multiple concurrent parallel data streams from the host interface 18. The data streams may be transferred to the compression module 40. Multiple concurrent parallel data streams may be received when the host and NVSM interfaces 18, 20 are, for example, SAS interfaces.

The compression module 40 compresses HDSs received from the host interface 18 when possible and prior to being received by the buffer managing module 44. The compression is performed on HDSs that are the same length as the HDSs received from the host interface 18. The compression module 40 may use lossy and/or lossless compression methods. Lossy compression and decompression provides data that is close but not the same as the original data after compression and decompression. Lossless compression and decompression provides reconstruction of the same data as the original subsequent to compression and decompression. Lossless data compression includes detecting repeating bit patterns and removing the redundancy.

The compression module 40 compresses host data sectors (HDSs) received from the host 13 when possible. The HDSs may be uncompressed, partially compressed, and/or fully compressed when received. An HDS may be the smallest length data element that is transmitted from the host 13 to the NVSM drive 14. Certain HDSs may not be compressible, for example, when lossless compression is used and a corresponding data pattern does not include redundancy.

The encryption module 42 encrypts the compressed HDSs. The encryption module 42 encrypts data received from the compression module 40. The encryption may include one or more public and private keys. The encryption may also include one or more keys that are specific to the NVSM drive 14 or a component of the NVSM drive 14, such as a key specific to the NVSM control module 27 and/or the NVSM 12.

The buffer managing module 44 stores the HDSs in a buffer 70 and forwards the HDSs to the DDS generating module 46. The buffer 70 may include volatile memory, such as RAM, dynamic RAM (DRAM), and/or static RAM (SRAM). The buffer managing module 44 may collect and store one or more HDSs prior to storage in the NVSM 12.

The buffer managing module 44 may: convert received DDSs from the encryption module 42 to HDSs when possible; receive HDSs from a component downstream from the buffer managing module 44 (between the buffer managing module 44 and the NVSM 12); and/or transfer HDSs to the decompression module 56. Each of the DDSs may be larger than or equal to the size of the HDSs. Decompressed HDSs are transmitted to the host 13. The buffer managing module 44 may combine and store the compressed and/or encrypted HDSs in a predetermined order regardless of the order in which the HDSs are received.

For example, HDSs may be received in a numerical order or may be received in a different order. Sequentially received HDSs may be stored in different HDS registers 72 to allow for reordering of the HDSs in a numerical or predetermined order. Thus, HDS registers 72 may be used to provide HDS sets 74 for respective DDSs (HDS registers 1-N and HDS sets 1-N are shown). As a HDS register is filled and/or a predetermined DDS length limit is met, an HDS set may be released from the buffer managing module 44 and passed to the DDS generating module 46. A predetermined DDS length limit is met, for example, when no further HDSs can be and/or are to be combined with other HDSs of a current DDS.

The DDS generating module 46 generates DDSs based on the combined and/or stored HDS(s) in the HDS registers 72 and based on HDS and DDS information. The DDS generating module 46 converts the HDSs to DDSs prior to storage in the NVSM 12. The HDS and DDS information may be received from the buffer managing module 44. The HDS and DDS information may include the HDS information bits and DDS information, such as DDS length, DDS bit slot availability, etc.

The DDS generating module 46 may generate each DDS to have the same bit length. Nuisance data refers to data that is added to one or more HDSs such that a generated DDS is of a predetermined bit length. Compressed HDSs may have different bit lengths. Different amounts of nuisance data is added to combine compressed HDSs to generate DDSs of equal length. The NVSM control module 27 prevents an HDS from being split between two DDSs by adding the nuisance data. Instead of storing portions of a HDS with two or more other HDSs, nuisance data is attached. The nuisance data may include, for example, all 0's, all 1's, null states, and/or redundant data to minimize programming and/or processing of the NVSM control module 27.

The ECC module 48 and the interface management module 50 may operate based on parameter signals from the command management module 60. The command management module 60 generates a first parameter signal 80 and a second parameter signal 82 based on commands and/or job descriptors 84 received from the NVSM control module 27 and/or a descriptor generating module 103.

During a data transfer event, the NVSM control module 27 or one of the other modules of the NVSM drive 14 receives the access request signals 30. The NVSM control module 27 may be implemented as a system-on-chip (SoC) and include or access a first non-volatile memory 90. The first non-volatile memory 90 stores firmware (FW) 92 executed by the NVSM control module 27. In executing the firmware 92, the NVSM control module 27 generates the descriptors 84 (referred to below as FW descriptors) based on the access request signals 30. The descriptors 84 are stored in a second non-volatile memory 94 and/or provided to the descriptor generating module 103. The second non-volatile memory 94 may be part of the command management module 60 or separate from the command management module 60, as shown. The second non-volatile memory 94 may store the descriptors 84 and/or descriptors 95 generated by the descriptor generating module 103. Descriptors generated using firmware, such as those generated by the NVSM control module 27, are referred to as firmware descriptors. Descriptors generated using hardware, such as those generated by the descriptor generating module 103, are referred to as hardware descriptors. The second non-volatile memory 94 may also store parameter information 96 for interpreting the descriptors 84, 95 to determine parameters and generate the parameter signals 80, 82, as described below.

In generating the descriptors 84, the NVSM control module 27 may determine: a size of an allocation block of data based on the access request signals, tables relating sizes of blocks of data to other parameters, an application of use, etc. A size of an allocation block of data may be referred to as an allocation unit (AU) size or an allocation block size. An application of use may indicate, for example, a type of host, a type of NVSM drive, and speeds of the host and the NVSM drive. The NVSM control module 27 generates the descriptors 84 to indicate the allocation block sizes. The descriptors 84 may each include: the allocation block sizes; buffer register locations; NVSM addresses; NVSM channel identifiers (IDs); NVSM device identifiers (e.g., memory chip IDs); data formats; amounts of data to transfer; type of operation bits (e.g., read, program, and/or erase bits); etc. Generation of the hardware descriptors 95 is described below.

Each of the allocation block sizes may be page based, sub-page based, or non-page based. An allocation block size is page based when the allocation block size is equal to the size of one or more pages of data. As an example a single page of data may be equal to 8 kilobytes (KB). Other example page sizes are 4 KB, 16 KB, and 32 KB. An allocation block size is sub-page based when the size of two or more allocation blocks of data is equal to the size of 1 page of data. An allocation block size is non-page based when the allocation block size is not an integer multiple of 1 page and an integer multiple of the allocation block size is not equal to the size of 1 page of data. An allocation block may include any amount of data.

Allocation blocks of data may be transferred to and from channels 100 of the NVSM 12. A transfer of one or more allocation blocks of data ("blocks of data") may be referred to as a data transfer event. Data transfer events may also occur, for example, between devices in series with and/or communicating with the channels. Example data transfer events between example devices and/or modules are shown in FIGS. 2-5.

The command management module 60 may determine: allocation block sizes, an ECC correction power (number of bit errors per data block corrected); buffer register locations; NVSM addresses; data formats; amounts of data to transfer; redundant array of independent disks (RAID) operations; read, program, and/or erase bits; etc. based on the descriptors 84. The command management module 60 executes the descriptors 84, 95 and/or generates the first and second parameter signals 80, 82 based on the descriptors 84, 95.

The first parameter signal 80 may include: an ECC correction power bit; buffer register location bits; NVSM address bits; data format bits; amount of data to transfer bits; a number of blocks of data to transfer bits; redundant array of independent disks (RAID) operation bits; read, program, and/or erase bits; etc. The second parameter signal 82 may include: NVSM address bits; allocation block size bits; a number of blocks of data to transfer bits; read, program, and/or erase bits; etc.

The ECC module 48 performs error correction and encodes and decodes the DDSs and data received from the NVSM 12. The ECC module 48 transfers DDSs to and receives DDSs from the interface management module 50 based on the first parameter signal 80. The interface management module 50 accesses the NVSM 12 based on the second parameter signal 82. The interface management module 50 transmits instruction signals 102 to the NVSM 12 to control access to the NVSM 12. The NVSM 12 transmits data signals to the interface management module 50 and/or receives data signals from the interface management module 50 via the channels 100 based on and/or according to the instruction signals 102. The instruction signals may include commands for reading data from and/or writing data to the NVSM 12. The instruction signals are used to signal the NVSM 12 that; a read operation or a program operation is to be performed; the amount of data and/or the number of allocation blocks being transferred; the addresses of the allocation blocks; etc.

For each descriptor, one or more sets of instructions may be generated. The descriptors may be page descriptors or allocation block descriptors. A page descriptor refers to a descriptor used to trigger and/or transfer one or more pages of data. An allocation block descriptor refers to a descriptor used to trigger and/or transfer one or more allocation blocks of data. The page descriptors and the allocation block descriptors may be trigger descriptors, read descriptors, or program descriptors. The trigger descriptors are used to initialize a data transfer event (read or program event). As an example, the trigger descriptors may identify a command type (read or program), target addresses within the NVSM 12 and/or buffer managing module 44, and how much data is to be transferred (e.g., number of pages and/or number of allocation blocks).

The read descriptors are used to read data from the NVSM 12. The program descriptors are used to program data to the NVSM 12. As an example, the read descriptors and the program descriptors may identify how much data is to be transferred and the locations of the data within a page of data. A descriptor may be both a trigger descriptor and a read descriptor. A descriptor may alternatively be both a trigger descriptor and a program descriptor.

The ECC module 48 and/or other ECC modules may be connected: between the compression module 40 and the encryption module 42 to encode compressed HDSs; between the encryption module 42 and the buffer managing module 44 to encode encrypted HDSs; between the buffer managing module 44 and the DDS generating module 46; and/or between the DDS generating module 46 and the NVSM 12 as shown. The DDSs are then stored in the NVSM 12.

The ECC module 48 may use one or more ECC methods to prevent errors when writing data to and reading data from the NVSM 12. Parity bits may be generated and added to the DDSs prior to being stored in the NVSM 12 and/or may be stored separate from the DDSs in the NVSM 12.

The interface management module 50 may store the DDSs at physical block addresses (PBAs) in the NVSM 12. The PBAs of the DDSs may be stored in one or more locations and acquired by the interface management module 50 when accessing storage locations of the DDSs in the NVSM 12. For example, the PBAs may be stored in the first non-volatile memory 90 and/or in the NVSM 12. The first non-volatile memory 90 or the NVSM 12 may store a mapping table 104 of the PBAs, which may be based on an allocation block size. As an example, PBA(s) associated with an allocation block may be identified in the mapping table 104. This is different than storing the PBAs based on a size of a page of data. The allocation block size may be set based on or independent of a size of a page of data. Since the firmware 92 stores the PBAs based on allocation block size, a change in allocation block size does not require a change in firmware instructions, but rather simply an allocation block size setting adjustment. The mapping table 104 may relate logical block addresses (LBAs) to PBAs. The mapping table 104 may be accessed by any of the modules in the paths 22, 24. The mapping table 104 may be stored in and/or shared with the descriptor generating module 103.

The interface management module 50 may access DDSs in the NVSM 12 prior to forwarding the DDSs to the ECC module 48. The ECC module 48 may decode DDSs accessed from the NVSM 12 based on access command signals and/or parity information associated with the DDSs. The access command signals may be generated by the NVSM control module 27 and/or the command management module 60 and include the first parameter signal 80. The access command signals may include one or more PBAs. The access command signals may be generated by the NVSM control module 27 and based on LBAs and/or access request signals received from the host 13. The HDS generating module 52 accesses or receives the DDSs from the ECC module 48 based on data request signals received, for example, from the buffer managing module 44.

The HDS generating module 52 and/or the buffer managing module 44 separate the received DDSs into HDSs. The HDS generating module 52 generates one or more HDSs based on decrypted DDSs received from the ECC module 48. The HDS generating module 52 generates the HDSs based on the HDS identification information and/or a data request signal. The data request signal may include one or more LBAs. The decryption module 54 decrypts decoded DDSs from the ECC module 48. The keys used by the encryption module 42 may be shared, accessed and/or generated by the decryption module 54.

Although the modules of the paths 22, 24 are shown in a particular order, they may be rearranged in a different order. For example, the encryption module 42 may be located upstream from the compression module 40. In other words, the encryption module 42 may be connected between the NVSM drive interface 20 and the compression module 40. As another example, the decryption module 54 may be connected between the NVSM drive interface 20 and the decompression module 56.

HW Descriptor Generation

The interface management control system 26 includes the NVSM control module 27 and a descriptor generating module 103. The NVSM control module 27 may operate according to firmware 92 stored in the memory 90 of the NVSM control module 27. The descriptor generating module 103 is included to reduce firmware overhead for generating descriptors via firmware. The descriptor generating module 103 may include an electronic circuit and/or other suitable hardware for generating descriptors as described herein. Although the following examples refer to the descriptor generating module 103 as including hardware, the descriptor generating module 103 may include logic devices and/or a processor, which may execute firmware for descriptor generation. Firmware executed by the descriptor generating module 103 may be separate from and different than the firmware 92 executed by the NVSM control module 27. The descriptor generating module 103 and the reaccess module 11 may be implemented as the same electronic circuit.

The descriptor generating module 103 may be triggered to generate descriptors (e.g., hardware descriptors) by the NVSM control module 27. The NVSM control module 27 generates the firmware (or first) descriptors 84 and forwards the firmware descriptors 84 to the memory 94. The NVSM control module 27 may generate a descriptor command signal to generate hardware descriptors and forward the descriptor command signal to the descriptor generating module 103. The descriptor command signals may be stored in a first-in-first-out (FIFO) memory 104 in the descriptor generating module 103. The descriptor command signals may include input parameters based on which the descriptor generating module 103 generates the second descriptors (e.g., hardware descriptors) 95. The memory 94 may include a FIFO memory allocated to storing the descriptors 84, 95.

The descriptor generating module 103 may then report to the NVSM control module 27, via an advanced microcontroller bus (AHB) 105, that the second descriptors are generated and stored in the memory 94. The generation of the second descriptors may be reported via a completion status flag generated by the descriptor generating module 103 and/or accessed by the NVSM control module 27 may detect the generation of the completion status flag by accessing the completion status flag in the memory 94. As another example, the completion of generating the second descriptors may be indicated via an interrupt generated by the descriptor generating module 103 and sent to the NVSM control module 27. Generation of the second descriptors by the descriptor generating module 103 reduces the amount of processing time of the NVSM control module 27 associated with the generation of descriptors. This allows the NVSM control module 27 to perform other tasks.

The NVSM control module 27 executes the firmware 92 to implement firmware-to-hardware and/or single-to-multiple descriptor operations disclosed below. As an example, the firmware 92 generates the firmware descriptors 84, which may each be converted to one or more other descriptors (e.g., hardware descriptors) by the descriptor generating module 103.

The command management module 60 communicates with the descriptor generating module 103 and may receive and/or execute descriptors (e.g., hardware descriptors) received from the descriptor generating module 103. The command management module 60 is in communication with the memory 94 via, for example, an advanced extensible interface (AXI) bus 112. The command management module 60 may be referred to as a sequencer as the command management module 60 may sequentially execute a sequence of descriptors generated by the descriptor generating module 103. The memory 94 may store the parameter information 96, the descriptors 84, and templates 106. The descriptors 84 may include firmware and/or hardware descriptors. The firmware descriptors may be received from the NVSM control module 27 and/or from the descriptor generating module 103. The hardware descriptors may be received from the descriptor generating module 103. The templates 106 may be used to generate the second descriptors 95, which may include descriptors generated in response to the first descriptors 84 and descriptors generated for reaccess events (e.g., reread events or rewrite events).

Hardware descriptor generation is further described with respect to FIGS. 4-14 below.

Reaccess Control

The interface management control system 26 and corresponding firmware and hardware are used to reaccess the NVSM 12 based on whether certain conditions exist. The firmware (e.g., firmware 92) may be used to initiate generation of reaccess descriptors and/or control generation of reaccess descriptors. A reaccess descriptor refers to a hardware descriptor that is associated with a reaccess event. The firmware may provide parameters such as size of data to be transferred and start and end addresses for read or write events. These parameters are stored in hardware registers 108 in the memory 94. The firmware 92 may be used to define the conditions in response to which a reaccess event is to be performed. These conditions may be set, controlled and/or monitored by the NVSM control module 27 based on the firmware 92. The conditions may include: detection of one or more data errors (e.g., read errors or write errors); detection of an uncorrectable error; and/or detection of a media circulant redundant check (MCRC) error. Another example condition includes determining whether a predetermined and/or maximum number of reaccess events for the same one or more memory cells has been performed. These conditions and/or corresponding parameters may be stored in the memory 94. The parameters may further include a number of reaccess attempts for each reaccessed address. The conditions and/or parameters may be stored in the hardware registers 108.

The NVSM control module 27, based on the firmware 92, may also control whether a hard decision reread mode or a multi-bit reread mode is to be performed. The hard decision reread mode includes sensing a voltage or value of a memory cell one time per access or reaccess event. The multi-bit reread mode includes sensing a voltage or value of a memory cell multiple times per access event. Rereading a value multiple times increases the probability that the ECC module 48 is able to properly determine a data bit value and/or correct a data bit value.

The interface management control system 26 includes the reaccess module 11 and a linklist module 107. The reaccess module 11 is included to reduce firmware overhead associated with reaccessing the NVSM 12 due to errors (e.g., read errors or write errors). The reaccess module 11 may include an electronic circuit and/or other suitable hardware for triggering generation of hardware descriptors to reaccess the NVSM 12. The reaccess module 11 monitors statuses of allocation blocks and if there are errors, triggers the descriptor generating module 103 to generate hardware descriptors to reaccess the NVSM 12. The reaccess module 11 may trigger generation of the hardware descriptors, for one or more reaccess events for the same one or more allocation blocks, independent of and/or without intervention by the NVSM control module 27. Although the following examples refer to the reaccess module 11 as including hardware, the reaccess module 11 may include logic devices and/or a processor, which may execute firmware for triggering descriptor generation. Firmware executed by the reaccess module 11 may be separate from and different than the firmware 92 executed by the NVSM control module 27.

The linklist module 107 generates linklists, which include addresses of the buffer 70 identifying where to store and/or access data received from and/or transferred to the NVSM 12. The linklists may be used by the ECC module 48 to transfer allocation blocks between the buffer 70 and the NVSM 12.

The interface management control system 26 including the modules 11, 27, 48, 50, 60, 103, 107 operate to trigger, control and perform reaccess events. This includes the NVSM control module 27 executing the firmware 92 to: set a maximum number of reaccess events (e.g., 4), schedule reaccess data flows, control Vref adjustments during reaccess events, and control different types of decoding. A Vref adjustment may be performed for each reaccess event. If more than one reaccess event is performed for the same address, memory cell, and/or group of addresses and/or memory cells, then multiple Vref adjustments may be performed. As an example, a different Vref adjustment may be performed for each successive reaccess event. The different types of decoding may include hard decision decoding, 2-bit LDPC decoding and/or other suitable types of decoding. The types of decoding may be set by the NVSM control module 27 and may be performed by the ECC module 48. Operations of the modules 11, 27, 48, 50, 60, 103, 107 pertaining to reaccess events are further described below with respect to the method of FIG. 15. The modules 11, 27, 48, 50, 60, 103 and 107 may be implemented as a single module. The modules 11, 48, 50, 60, 103 and 107 may be implemented as hardware and/or as a single electronic circuit separate from the module 27.

Figure 2:
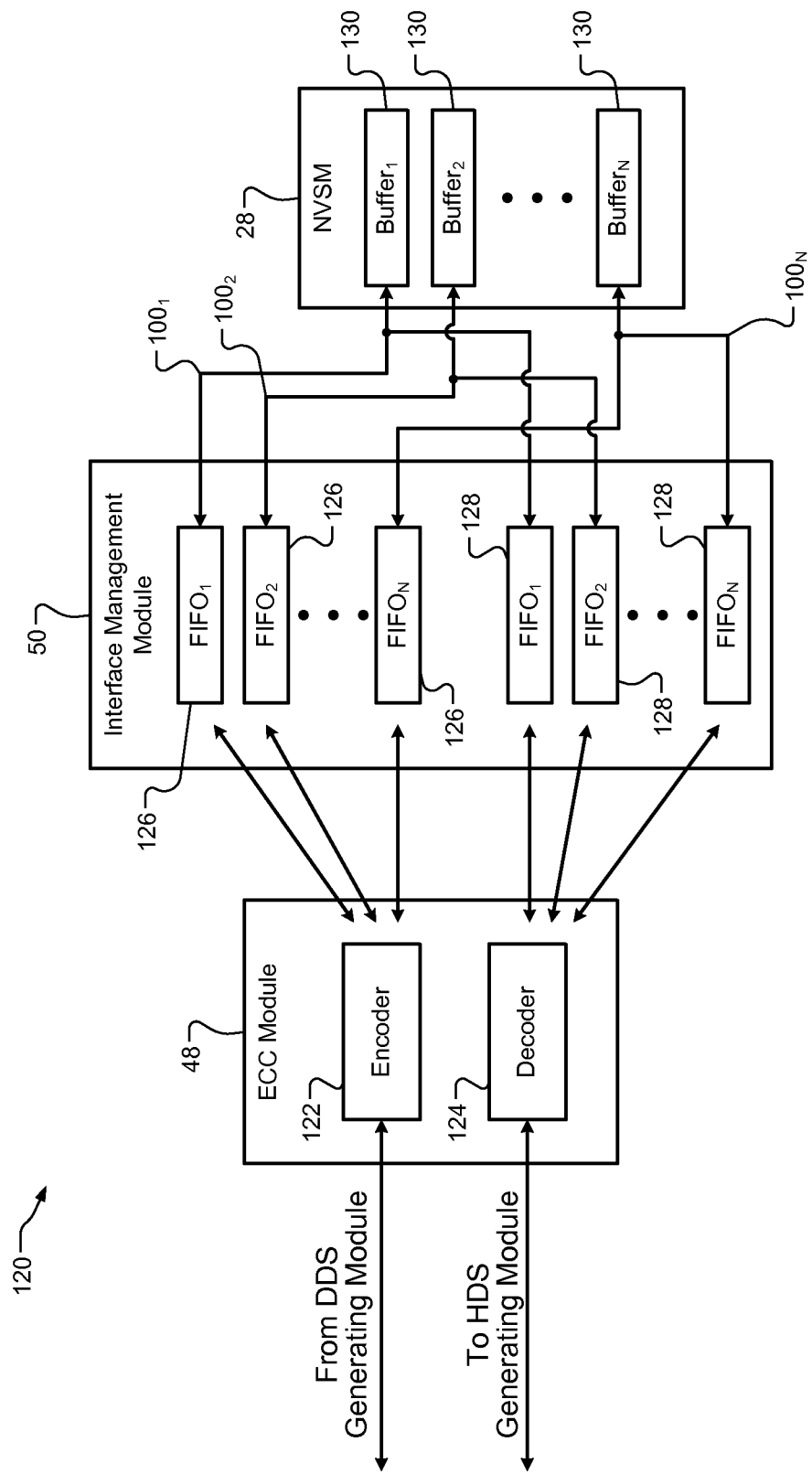
FIG. 2 is a functional block diagram of a portion of the interface management control system according to the present disclosure.

FIG. 2 shows a portion 120 of the interface management control system 26 including the ECC module 48, the interface management module 50, and the NVSM 12. The ECC module 48 includes an encoder 122 and a decoder 124. The encoder 122 encodes DDSs and forwards the encoded DDSs in the form of allocation blocks of data to the interface management module 50. The encoder 122 may combine an integer multiple of DDSs to form an allocation block of data. The decoder 124 decodes allocation blocks of data from the interface management module 50 to generate DDSs.

The interface management module 50 includes, for the example shown, a first series of FIFO registers 126 and a second series of FIFO registers 128. The first series of FIFO registers 126 are associated with program events and are used to buffer data transferred from the ECC module 48 to the NVSM 12. The second series of FIFO registers 128 are associated with read events and are used to buffer data transferred from the NVSM 12 to the ECC module 48. Although a FIFO register series is shown for each of the encoder 122 and decoder 124, the interface management module 50 may include a single series of FIFO registers, which are shared by the encoder 122 and the decoder 124. The first and second FIFO registers 126, 128 may include, for example, SRAM or other suitable memory devices.

Figure 7:
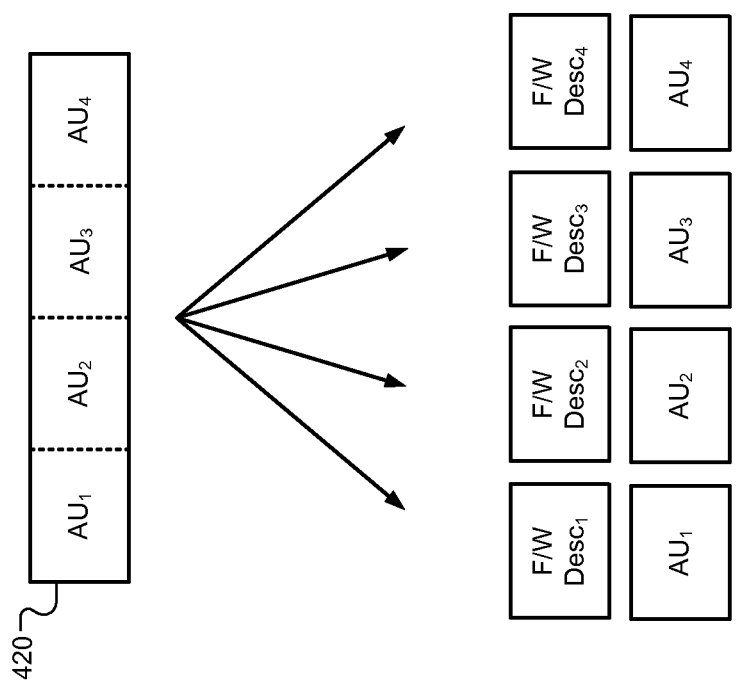
FIG. 7 is block diagram illustrating generation of a firmware descriptor per allocation unit according to the present disclosure.
Figure 14:
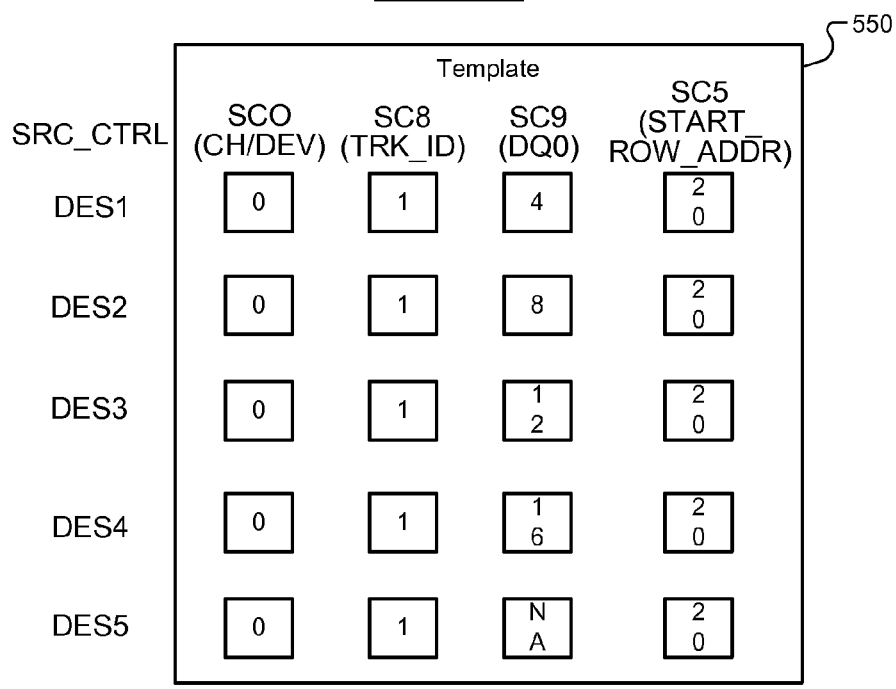
FIG. 14 illustrates an example of a template according to the present disclosure.

The size of each of the FIFO registers 126, 128 may be greater than or equal to an allocation block size set by the NVSM control module 27. The size of each of the FIFO registers 126, 128 may be greater than, equal to, or less than the size of a page of data, as the allocation block size may be greater than, equal to, or less than the size of a page of data. An example of FIFO registers sized equal to a size of a page of data is shown in FIG. 7. An example of FIFO registers sized less than a size of a page of data is shown in FIG. 14.

The interface management module 50 communicates with the NVSM 12 over the channels $100_{1-N}$. Each of the FIFO registers 126, 128 is associated with a respective one of the channels $100_{1-N}$. The FIFO registers 126, 128 temporarily store data prior to being stored in the NVSM 12 and/or prior to being transferred to the buffer managing module 44 (shown in FIG. 1). The NVSM 12 may include buffers 130 for each of the channels $100_{1-N}$. The FIFO registers 126, 128 and/or the buffers 130 may be used to balance different bandwidths (or speeds) between the encoder 122 and the NVSM 12 and/or between the decoder 124 and the NVSM 12.

The bandwidth of the ECC module 48 may be different than the bandwidth of the NVSM 12. The speeds of the encoder 122 and the decoder 124 may be faster than the speeds of each of the channels $100_{1-N}$. For example, the speeds of each of the encoder 122 and the decoder 124 may be 8-16 times faster than the speed of each of the channels $100_{1-N}$. Speed differences may also result due to, for example, data flow "bottlenecks" or delays in one or more of the channels $100_{1-N}$, which may be due to operations of the interface management module 50 and NVSM 12. The FIFO registers 126, 128 and the buffers 130 aid in balancing out the speed differences. The speed of the encoder 122 may be set to maintain operation of the channels $100_{1-N}$ at peak operating speeds. The speed of the decoder 124 may be set to prevent filling of the second set of FIFO registers 128 and maintain output of the channels $100_{1-N}$ at the peak operating speeds.

Figure 3:
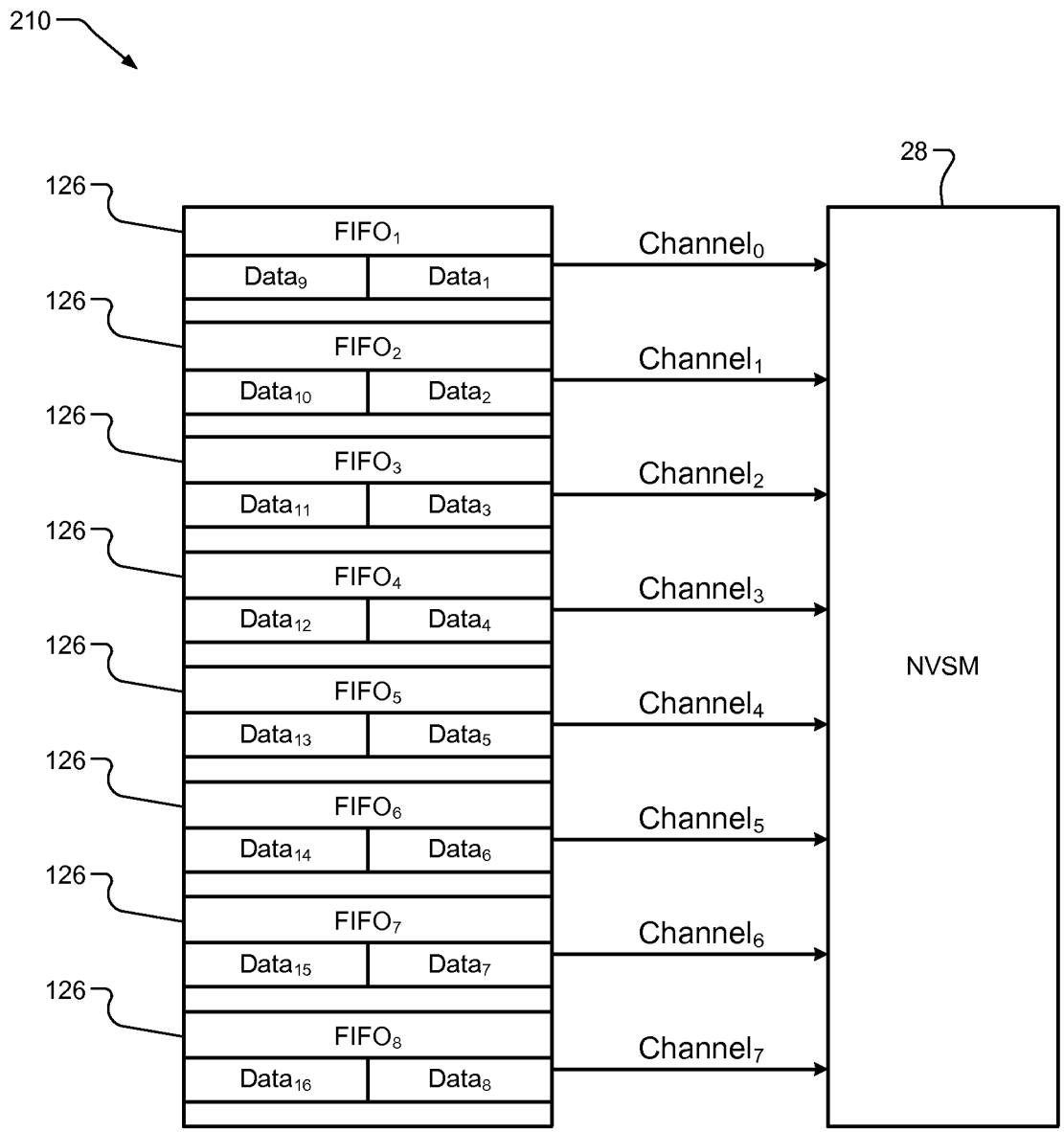
FIG. 3 is a functional block diagram of a portion of an interface management control system illustrating multi-page program events with page-sized transfers according to the present disclosure.

In FIG. 3, a portion 210 of an interface management control system is shown illustrating multi-page program events with page-sized transfers. The portion 210 may be incorporated into the interface management control system 26 of FIG. 1. Each transfer may fill one of the FIFO registers 126 of the interface management module 50. Each page of data transferred may have two associated page descriptors.

Each of the FIFO registers 126 is connected to a respective one of Channels$_{0-7}$ of the NVSM 12. Channels$_{0-7}$ may be included in the channels 100 of FIG. 1. Although the FIFO registers 126 may each be sized to store more than 1 page of data, the FIFO registers 126 are each shown as being able to store 1 page of data. If a multi-page (M-page) transfer is performed (as described above), the FIFO registers 126 do not need to be sized to store M pages of data, as one or more page descriptors are used per page of data transferred. Sizing the FIFO registers 126 to store a single page of data rather than two or more pages of data reduces memory allocated for the FIFO registers 126 and decreases data transfer times. If only a single descriptor was used to transfer the M pages of data, each of the FIFO registers 126 would need to be sized to equal the amount of data in a page of data, because each descriptor is associated with a single channel and/or a single FIFO register.

In a multi-page transfer event, data that is provided to the interface management module 50 is spread across multiple channels page-by-page. Pages of data Data$_{1-16}$ are shown. A single page is transferred to each of the Channels$_{0-7}$ prior to sending a second page to any of the Channels$_{0-7}$. The pages of data are transferred from the FIFO registers 126 to the Channels$_{0-7}$ based on speeds of the Channels$_{0-7}$ and/or devices internal to the NVSM 12. As the pages of data are transferred to each of the FIFO registers 126, probability of a data bottleneck at any one of the FIFO registers 126 is reduced. For example, if transfer speed of a first channel (e.g., Channel$_0$) is slow, a bottleneck at a corresponding first FIFO register FIFO$_1$ may not occur, as pages of data are loaded into the other FIFO registers FIFO$_{2-8}$ prior to loading another page of data into the first FIFO register FIFO$_1$.

Figure 4:
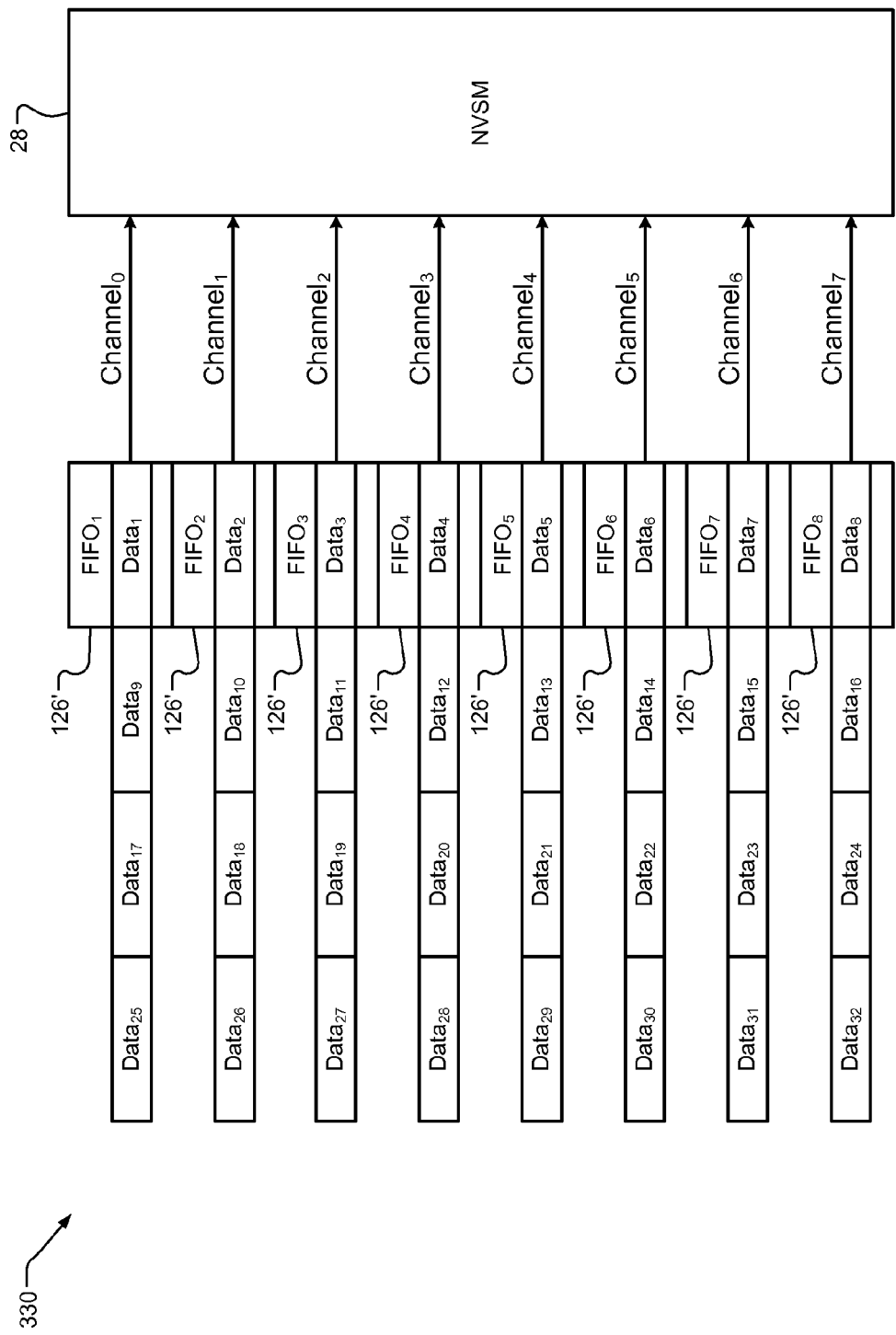
FIG. 4 is a functional block diagram of a portion of an interface management control system illustrating an allocation block based program events with allocation block sized transfers according to the present disclosure.

In FIG. 4, a portion 330 of an interface management control system is shown illustrating an allocation block based program events with allocation block sized transfers. This portion 330 may be incorporated into the interface management control system 26 of FIG. 1. Each allocation block of data transferred may fill one of FIFO registers 126' of the interface management module 50. Each allocation block of data transferred may have, for example, two or three associated allocation block descriptors.

Each of the FIFO registers 126' is connected to one of Channels$_{0-7}$ of the NVSM 12. Although the FIFO registers 126' may each be sized to store more than 1 allocation block of data, the FIFO registers 126' are each shown as being able to store 1 allocation block of data.

The size of each of the FIFO registers 126' may be based on the size of the allocation blocks of data and may be independent of a size of a page of data. Any number of allocation blocks may be equal to the size of one page of data. Reducing the sizes of the allocation blocks of data and the FIFO registers 126' can further increase data transfer speeds, increase parallel data transfer efficiency, and prevent data bottlenecks.

In a multi-allocation block transfer event, data that is provided to the interface management module 50 is spread across multiple channels block-by-block. Allocation blocks of data Data$_{1-32}$ are shown. A single allocation block of data is transferred to each of the channels prior to sending a second allocation block to any of the channels. The allocation blocks of data are transferred from the FIFO registers 126' to the channels based on speeds of the channels and/or devices internal to the NVSM 12. As the allocation blocks of data are transferred to each of the FIFO registers 126', probability of a data bottleneck at any one of the FIFO registers 126 is reduced.

Figure 5:
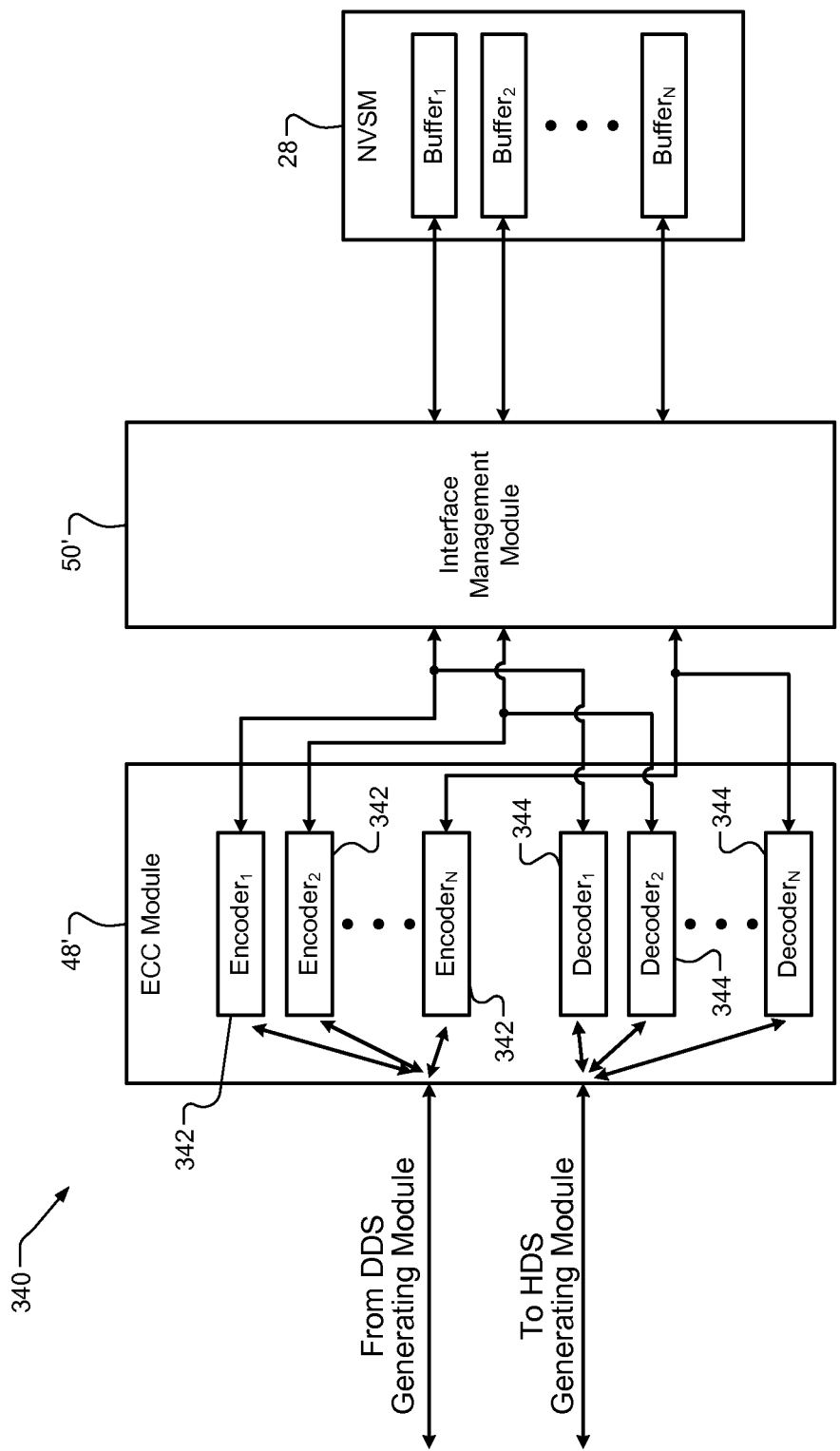
FIG. 5 is a functional block diagram of a portion of an interface management control system incorporating multiple encoders and decoders according to the present disclosure.

FIG. 5 shows a portion 340 of an interface management control system. The portion 340 may be incorporated into the interface management control system 26 of FIG. 1, replace the portion 120 of FIG. 2, and includes an ECC module 48', an interface management module 50' and the NVSM 12. Unlike the implementation of FIG. 2, the ECC module 48' includes multiple encoders 342 and multiple decoders 344 and the interface management module 50' does not include FIFO registers. Each of the encoders 342 may transfer data at approximately the same speed as the channels 100 of the NVSM 12.

During a program event, the DDS generating module 46 may spread allocation blocks of data to the encoders 342 similar to the spreading of allocation blocks of data to FIFO registers as described with respect to FIG. 2. The implementation of FIG. 5 further decreases the amount of memory used to transfer data to and from the NVSM 12 by not incorporating FIFO registers in the interface management module 50'. As FIFO registers are not incorporated, this implementation can support any page size or allocation block size. This increases development flexibility of the firmware 92. This implementation may also increase parallel data transfer efficiency.

Use of FIFO registers with sizes less than the size of a page and/or the elimination of FIFO registers, as described in FIGS. 4-5, minimizes hardware/memory requirements.

Figure 6:
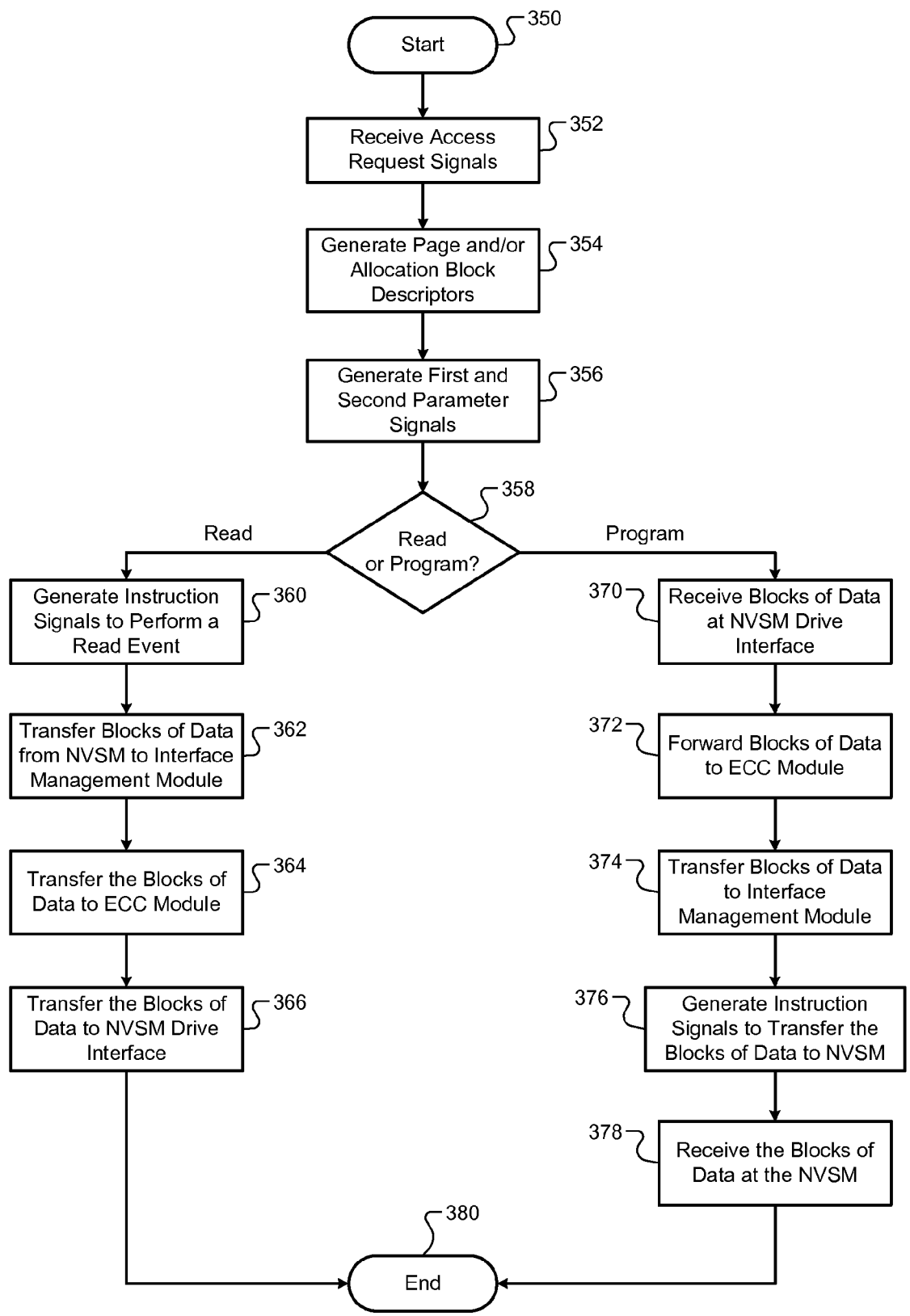
FIG. 6 illustrates a method of operating a NVSM storage system and a NVSM drive according to the present disclosure.

The NVSM storage system 10 and/or the NVSM drive 14 may be operated using numerous methods, an example allocation block based method is provided by the method of FIG. 6. In FIG. 6, a method of operating a NVSM storage system and a NVSM drive is shown. Although the following tasks are primarily described with respect to the implementations of FIGS. 1-15, the tasks may be easily modified to apply to other implementations of the present disclosure. The tasks may be iteratively performed. The method may begin at 350.

At 352, the NVSM drive interface 20 receives access request signals from the host interface 18 requesting that read, program, and/or erase events be performed.

At 354, the NVSM control module 27 generates page and/or allocation block descriptors based on the access request signals. The page and/or allocation block descriptors may be generated to perform one or more data transfer events. Each of the data transfer events may be a read event or a program event and include only one read preparing period or one program preparing period. The number of descriptors generated per data transfer event, page of data transferred, and/or allocation block of data transferred may be determined by the NVSM control module 27.

Each of the data transfer events includes two or more descriptors. The number of pages of data and/or the number of allocation blocks of data per transfer event may also be determined by the NVSM control module 27 and indicated in the generated descriptors. One or more pages of data and/or one or more allocation blocks of data may be transferred per data transfer event. Page sizes may be predetermined and fixed or may be set by the NVSM control module 27.

At 356, the command management module 60 generates the first parameter signal 80 and the second parameter signal 82 as described above based on the page and/or allocation block descriptors generated at 354.

At 358, an ECC module (e.g., one of the ECC modules 48, 48') and an interface management module (e.g., one of the interface management modules 50, 50') determine whether a read event or a program event is to be performed based on the first parameter signal 80 and the second parameters signal 82. Task 360 is performed when a read event is performed. Task 370 is performed when a program event is performed.

At 360, the interface management module generates the instruction signals 102 to instruct the NVSM 12 to transfer blocks of data from the NVSM 12 to the interface management module via the channels 100. The instruction signals 102 are generated based on the second parameter signal 82.

At 362, the NVSM 12 prepares for and transfers the pages of data and/or the allocation blocks of data to one or more of the channels 100 based on the instruction signals. The pages of data and/or the allocation blocks of data may be received by FIFO registers of the interface management module.

At 364, the pages of data and/or the allocation blocks of data are transferred from the interface management module to the ECC module based on the parameter signals 80, 82. The pages of data and/or the allocation blocks of data may be transferred to one or more decoders of the ECC module, as shown in FIGS. 2-5.

At 366, the pages of data and/or the allocation blocks of data are transferred to the NVSM drive interface 20 via, for example, the HDS generating module 52, the buffer managing module 44, the decryption module 54 and the decompression module 56. The host 13 may receive the pages of data and/or the allocation blocks of data from the NVSM drive interface 20. Subsequent to performing task 366, the method may return to task 352 or end at 380, as shown.

At 370, the pages of data and/or the allocation blocks of data are received by the NVSM drive interface 20. At 371, the pages of data and/or the allocation blocks of data are forwarded to the ECC module via, for example, the compression module 40, the encryption module 42, the buffer managing module 44 and the DDS generating module 46.

At 372, the ECC module may transfer the pages of data and/or the allocation blocks of data to the interface management module based on the first parameter signal 80. The pages of data and/or the allocation blocks of data may be transferred from an encoder of the ECC module and spread to one or more FIFO registers of the interface management module, as shown in FIGS. 2-4. As an alternative, the pages of data and/or the allocation blocks of data may be transferred from multiple encoders of the ECC module to the interface management module, as shown in FIG. 5.

At 374, the interface management module generates instruction signals 102 to transfer the pages of data and/or the allocation blocks of data to the NVSM 12 based on the second parameter signal 82.

At 376, the NVSM 12 receives the pages of data and/or the allocation blocks of data via the channels 100. Subsequent to performing task 376, the method may return to task 352 or end at 380, as shown.

The above-described tasks of FIG. 6 are meant to be illustrative examples; the tasks may be performed sequentially, synchronously, simultaneously, continuously, during overlapping time periods or in a different order depending upon the application. For example, task 374 may be performed while task 376 is performed.

Some of the examples described above use multiple descriptors (as defined above) per page and/or multiple descriptors per allocation block transferred to and/or from NVSM. By generating and using multiple descriptors, firmware flexibility is increased over using only a single descriptor per transfer. Other examples are provided below that include generating one descriptor per allocation block. Performing data transfers based on a selected allocation block size allows read and program events to be performed independent of page sizes and allows a NVSM drive to accommodate any page size of a NVSM. Allocation blocks that are smaller than the size of a page are easier for firmware of a NVSM control module to handle, easier to encode and decode, and are easier for a host to handle. Reading allocation blocks from a NVSM as opposed to reading pages of data reduces read latency.

Also, allocation block based transfers allow for FIFO sizes of an interface management module of a NVSM drive to be independent of page sizes. Also, by spreading allocation blocks of data over multiple channels of a NVSM per transfer event improves transfer efficiency. The data may be spread to multiple channels without waiting for an additional block of data to be loaded into a FIFO of a channel, which has already received a block of data. This further decreases transfer latencies.

FIG. 7 illustrates generation of a firmware descriptor per allocation unit. A NVSM control module may generate a firmware descriptor per allocation unit, which may then be stored in a memory. As an example four allocation units (or blocks) of data $AU_{1-4}$ are shown. The NVSM control module generates firmware descriptors F/W $Desc_{1-4}$ for the $AU_{1-4}$ to control operation of a NVSM. The firmware descriptors F/W $Desc_{1-4}$ correspond respectively to the allocation units of data $AU_{1-4}$. The allocation units of data $AU_{1-4}$ are shown collectively as a single block of data 420 prior to the generation of the firmware descriptors. The allocation units of data $AU_{1-4}$ are shown separately subsequent to the generation of the firmware descriptors. The allocation units of data $AU_{1-4}$ may be separated to allow for parallel transfer of the allocation units of data $AU_{1-4}$ during the same period of time.

Figure 8:
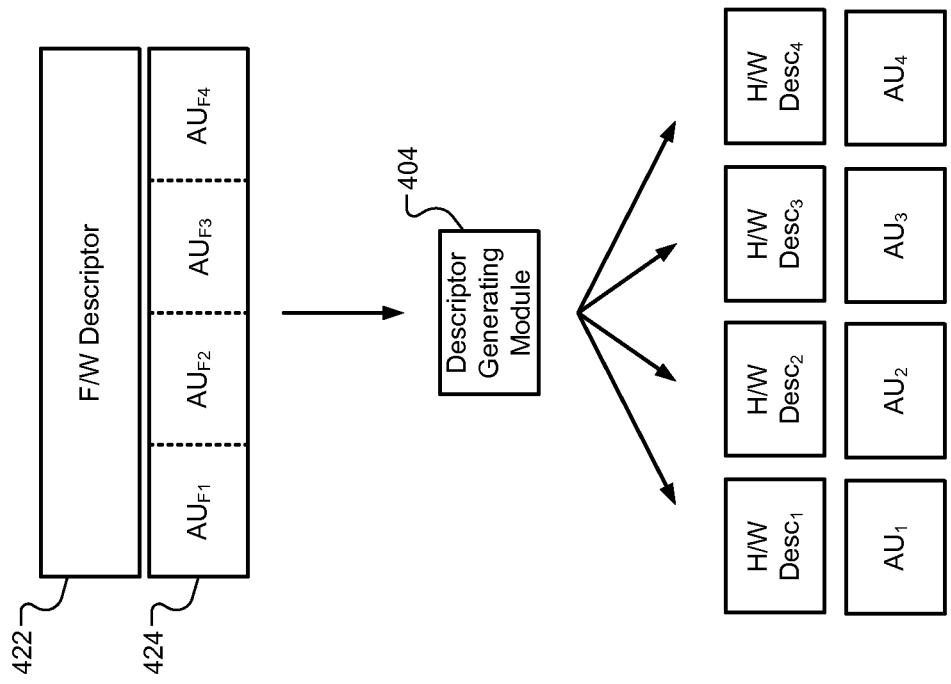
FIG. 8 is a block diagram illustrating generation of a hardware descriptor per allocation unit according to the present disclosure.

FIG. 8 illustrates generation of a descriptor (e.g., hardware descriptor) per allocation unit, as described with respect to the embodiments of FIG. 1. The NVSM control module 27 may generate a firmware (or first) descriptor 422 for a single block of data 424 having a predetermined number of allocation units of data $AU_{1-4}$. The firmware descriptor 422 may be stored in the memory 94 and/or provided to the descriptor generating module 103. The descriptor generating module 103 may generate a second descriptor for each of the allocation units of data $AU_{1-4}$. The second descriptors may be hardware descriptors and are identified as H/W $Desc_{1-4}$. The second descriptors are used to control the NVSM 12. The amount of data associated with the second descriptors is the same as the amount of data associated with the firmware descriptor 422 generated by the NVSM control module 27. Although a one-to-one relationship is shown between the second descriptors and the allocation units of data $AU_{1-4}$ in FIG. 8, each of the second descriptors may be associated with one or more allocation units of data $AU_{1-4}$. Conversions from firmware (or first) descriptors to the hardware (or second) descriptors is further described below.

Each of the allocation units of data $AU_{1-4}$ may have any amount of data. The size of the allocation units of data $AU_{1-4}$ may be predetermined, fixed and/or set by the NVSM control module 27. The size of the allocation units may be less than, equal to, or greater than the size of a page of data. Each of the second descriptors may be used to control the transfer of one or more pages of data and thus may correspond to a single or multiplane read and/or program (or write) operation. The descriptor generating module 103 may generate the second descriptors to spread the allocation units of data $AU_{1-4}$ to multiple channels of the NVSM 12 to maximize parallel transfer of data between the interface management module 50 and the NVSM 12.

The above-described features of FIGS. 1 and 8 allow the NVSM control module 27 to generate a single firmware descriptor when performing a multiplane (multiple page) transfer of data. This is because the descriptor generating module 103 converts the single firmware descriptor into multiple descriptors, which are executed by the command management module 60. The generation of the descriptors by the descriptor generating module 103 allows the NVSM control module 27 to continue to dispatch data to and from the NVSM 12 in an order recognizable to the NVSM 12. The descriptor generating module 103 may perform address mapping instead of the NVSM control module 27. The descriptor generating module 103 may map, for example logical block addresses for allocation units of data to physical block addresses. The physical block addresses are addresses of memory locations in the NVSM 12. The dispatching of data, the generating of descriptors, and the address mapping performed by the descriptor generating module 103 minimize the amount of calculations performed by the NVSM control module 27 in performing data transfers.

The memory 94 may include first-in-first-out (FIFO) registers as shown, for example, in FIG. 2. Each of the FIFO registers may be the same size as an allocation unit. As a result, the sizes of the FIFO registers may be independent of a page size of data. The matching of the sizes of the FIFO registers with the sizes of the allocation units of data, prevents speed mismatching between, for example, the ECC module 48 of FIG. 2 and the FIFO registers. By transferring amounts of data that are smaller than a page of data, less data is transferred in an out of the FIFO registers per transfer event, which allows for quicker data transfers. This reduces data transfer latencies associated with the FIFO registers. To further reduce transfer latencies, the ECC module 48 may rotate through the FIFO registers and/or corresponding channels when receiving data from and transferring data to the NVSM 12. A block of data may be split up into two or more portions of data during a transfer. For example, a 16 kilobytes (KB) block of data may be divided into two 8 KB portions. The first portion may be transferred to and/or from a first FIFO register while the second portion is transferred to and/or from a second FIFO register.

Figure 9:
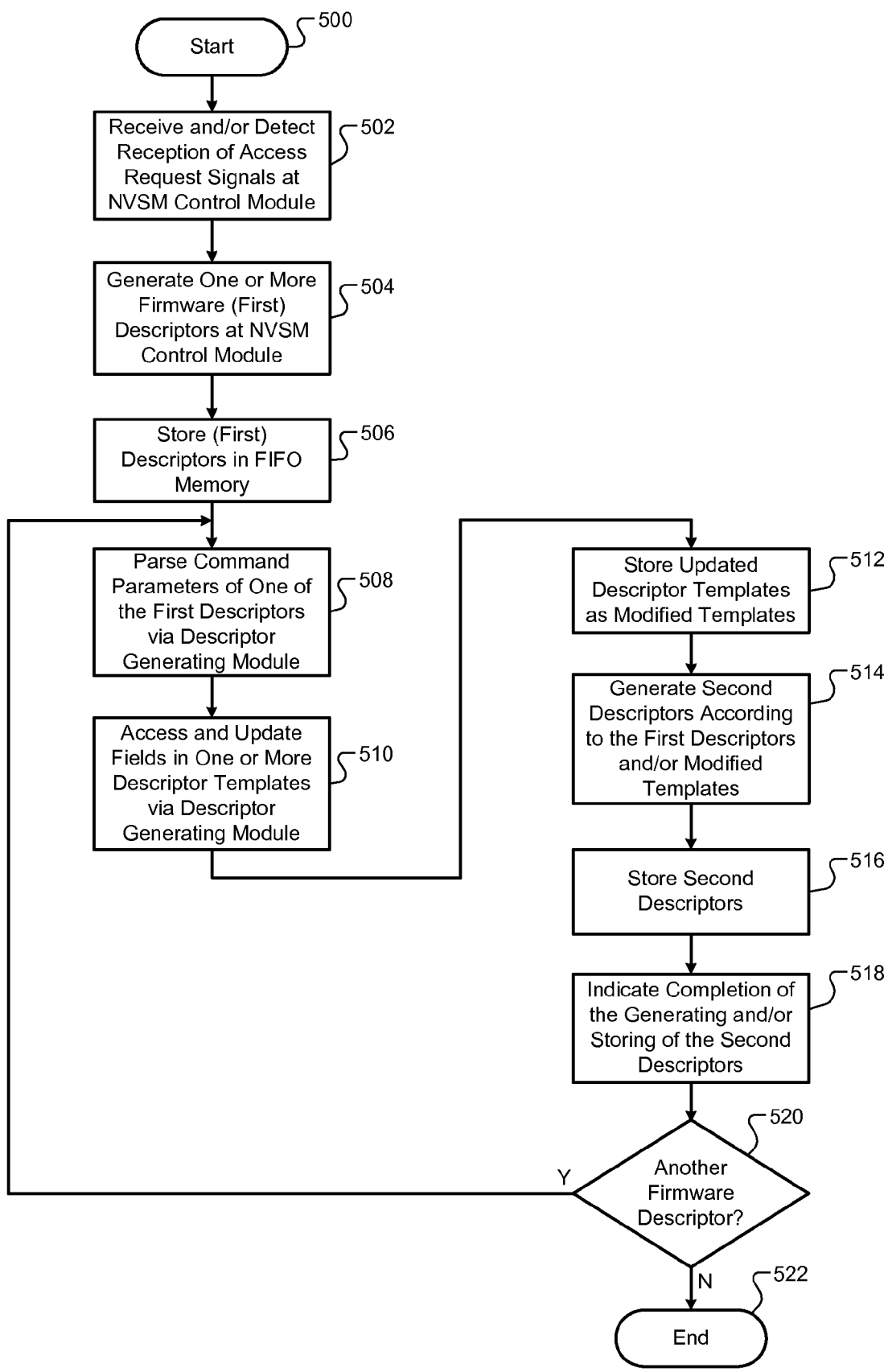
FIG. 9 illustrates a descriptor generating method according to the present disclosure.

As stated above, the NVSM storage systems disclosed herein may be operated using numerous methods. Another example method is illustrated in FIG. 9. FIG. 9 illustrates a descriptor generating method. Although the tasks of FIG. 9 are primarily described with respect to the examples of FIGS. 1 and 8, the tasks may be applied to other embodiments of the present disclosure. The tasks of may be iteratively performed.

Figure 10:
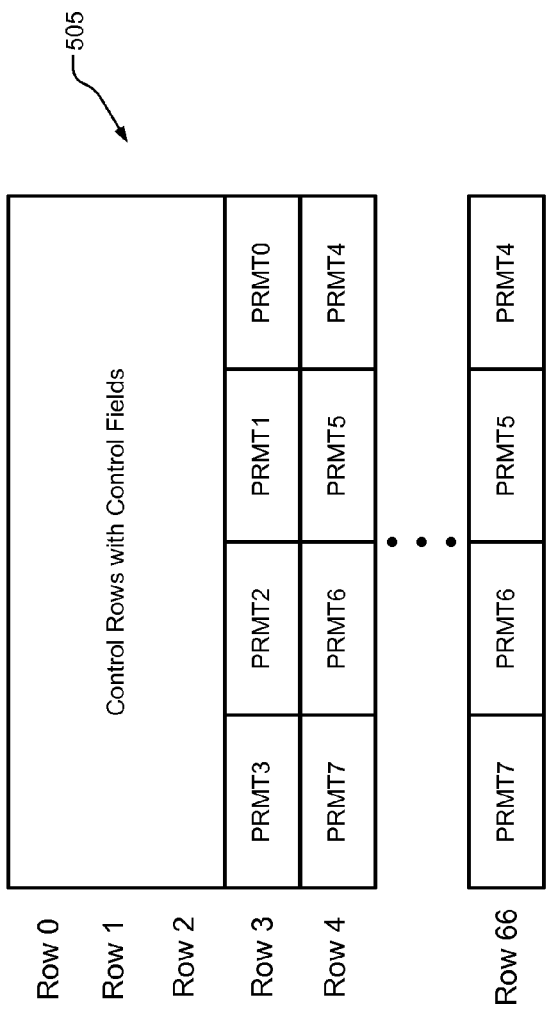
FIG. 10 illustrates an example of a firmware descriptor generated by a NVSM control module according to the present disclosure.

The method may begin at 500. At 502, the NVSM control module 27 receives and/or detects reception of access request signals from the host device 13. At 504, the NVSM control module 27, using the firmware 92, generates one or more firmware (first) descriptors based on the access request signals. FIG. 10 shows an example of a firmware descriptor 505 generated by the NVSM control module 27. The firmware descriptor 505 may include 3 control rows (identified as Rows 0-2) and 64 parameter rows (identified as Rows 3-66). Each of the control rows and parameter rows may have a word of information. Each of the words may be referred to as a descriptor word (or DWORD). Any number of control rows and parameter rows may be included in a firmware descriptor. In the parameter rows, each byte of information may be referred to as an input parameter. Each DWORD in the parameter rows may include 4 bytes of parameters. Since each firmware descriptor may include 64 parameter rows, each firmware descriptor may include 256 parameters.

Figure 11:
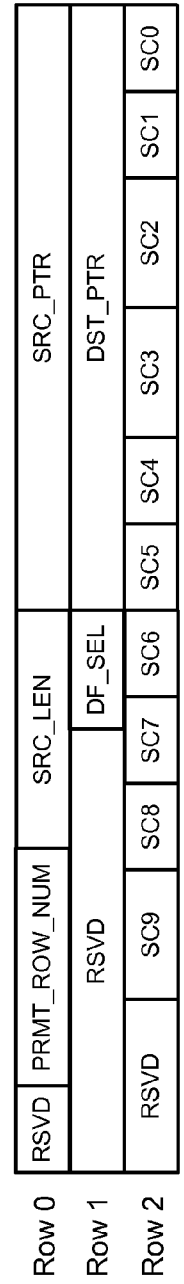
FIG. 11 illustrates examples of control rows for the firmware descriptor of FIG. 21.

The control rows of the firmware descriptor include control fields with control information. FIG. 11 shows an example of control rows for the firmware descriptor 505 of FIG. 10. The first control row Row 0 includes control fields PRMT_ROW_NUM, SRC_LEN and SRC_PTR. The second control row Row 2 includes control fields DF_SEL and DST_PTR. The third control row Row 3 includes control fields SC0-SC9. Reserved fields RSVD may be used for other control information. Descriptions for the control fields PRMT_ROW_NUM, SRC_LEN, SRC_PTR, DF_SEL and DST_PTR, and SC0-SC9 are provided in the below table.

Table of Firmware Descriptor Fields

| Descriptor Field | Description |
| --- | --- |
| SRC_PTR | This field is a descriptor template pointer that indicates location of a template. May indicate physical address of template in the memory 94. The descriptor generating module 103 locates templates for descriptors based on the descriptor template pointer. |
| SRC_LEN | This field is indicates a descriptor template length and/or a number of, for example, descriptors (e.g., hardware descriptors) to generate. The descriptor generating module 103 uses the SCR-LEN filed to determine the number of descriptors to generate for the corresponding template and/or corresponding firmware descriptor. |
| PRMT_ROW_NUM | This field indicates the number of parameter rows in the corresponding firmware descriptor. |
| DST_PTR | This field is a pointer indicating a location for storing the descriptors generated by the descriptor generating module 103 in the memory 94. May indicate one or more addresses in the memory 94. The descriptor generating module 103 stores the generated descriptors at the addresses indicated by the DST_PTR. |
| DF_SEL | This field is a priority selector field that indicates which type of FIFO memory or area of memory to put the descriptors generated by the descriptor generating module 103. The |

Table of Firmware Descriptor Fields

| Descriptor Field | Description |
| --- | --- |
| | memory 94 may include two or more FIFO registers. As an example, the memory 94 may include high priority FIFO registers and low priority FIFO registers. The DF_SEL field may indicate whether to put the descriptors generated by the descriptor generating module 103 in a high priority FIFO register or a low priority FIFO register. The descriptors in high priority FIFO registers may be executed by the command management module 60 prior to the descriptors in the low priority FIFO registers. The descriptors in high priority FIFO registers may be executed quicker than the descriptors in the low priority FIFO registers. |
| SC0 | This control field indicates a channel and a device to send user data or other data associated with one or more descriptors generated by the descriptor generating module 103. Examples of channels are shown in FIG. 3. The device refers to a NVSM chip. For example, the NVSM 12 may include multiple NVSM and/or NAND chips. |
| SC1 | This control field is used for RAID control and may include a command RAID_CMD and an identifier RAID_ID. This control field may be used by the descriptor generating module 103 to generate read stripes. |
| SC2 | This control field is used for streaming control of data between a buffer managing module (e.g., the buffer managing module 44 of FIG. 1) and NVSM 12. This field may indicate whether to stream and/or transfer data from the buffer managing module to the NVSM 12 or to stream and/or transfer data from the NVSM 12 to the buffer managing module. This control field may alternatively indicate to stream and/or transfer data from the buffer managing module to the NVSM 12 while streaming and/or transferring data from the NVSM 12 to the buffer managing module. |
| SC3 | This control field indicates an address START_ROW_ADDR in the NVSM 12 where to start a data transfer. Data written to the NVSM 12 may begin at the address START_ROW_ADDR or data may be read from the NVSM 12 starting at the address START_ROW_ADDR. The address START_ROW _ADDR may include three parameters. The parameters include a page address, a block address, and a lun address. The page address is used as a row index to identify a specific row of memory cells. The block address is used as an array index to identify a specific array of memory cells. The lun address is used as a device, NVSM chip, and/or NAND chip index to identify a specific device, NVSM chip, and/or NAND chip. |
| SC4 | This control field indicates a column address START_COL_ADDR to start at when accessing the NVSM 12. |
| SC5 | This control field indicates how much data is being transferred for the one or more descriptors generated by the descriptor generating module 103. An amount of data per descriptor may be indicated. |
| SC6 | This control field may identify the segments of the buffer 70 in the buffer managing module 44 to be involved in a data transfer. Data may be transferred to or from a first segment of the buffer 70 while transferring data to or from another segment of the buffer 70. Data may be streamed to or from multiple segments of the buffer 70 during the same period of time. |
| SC7 | This control field may include pointers to physical addresses in the buffer of the buffer managing module. The buffer managing module 44 may jump (or skip) addresses when data is being transferred. When this occurs physical addresses may be effectively linked using the pointers. This field may be used by the descriptor generating module 103 to convert logical block addresses to physical block addresses while accounting for the skipped addresses by using the provided pointers. |
| SC8 | This control field may be referred to as a command group identifier (ID) and used to identify a group of firmware descriptors stored in the memory 94. The descriptor generating module 103 may return this ID to the NVSM control module 27 subsequent to completing generation of descriptors by the descriptor generating module 103. |

Table of Firmware Descriptor Fields

| Descriptor Field | Description |
| --- | --- |
| SC9 | This control field may be used to control parameters of the NVSM 12. For example, this field may include voltage reference adjustment values VREF used by NAND to distinguish between bit values stored in memory cells of the NAND. |

In addition to the information stated in the above table, each of the control fields of a firmware descriptor may also indicate whether to use either (i) default values and/or information in a template, or (ii) replace the default values and/or information in the template with corresponding values and/or information in the parameter rows of the firmware descriptor. For example, the control field SC0 may include a default bit, which may be set to '0' to indicate use of a corresponding default byte value in a template. The default bit may be set to '1' to indicate use of a corresponding byte value provided as one of the parameters in a parameter row of the firmware descriptor. The control fields may include more than one default bit. For example, the control field SC3 may include a default bit for each of a page address, a block address, and a lun address to indicate whether to use a default page address, a default block address, and/or a default lun address. In addition, each of the control fields may have different formats and the formats of the control fields may be set based on the application in which the corresponding NVSM system is being used.

At 506, the NVSM control module 27 sends the firmware descriptors to the memory 94. At 507, the NVSM control module 27 may trigger the descriptor generating module 103 subsequent to storing the firmware descriptors. The NVSM control module 27 may trigger the descriptor generating module 103 by, for example, sending a descriptor command signal to the descriptor generating module 103 indicating the transfer of the one or more firmware descriptors to the memory 94. Task 507 may not be performed. As another example, the descriptor generating module 103 may detect the transfer of the firmware descriptors and begin generation of hardware descriptors without receiving a command signal from the NVSM control module 27.

At 508, the descriptor generating module 103 accesses the FIFO memory 104 and parses command parameters from one or more of the descriptor command signals and/or the firmware descriptors. At 510, the descriptor generating module 103 accesses one or more descriptor templates (referred to hereinafter as "templates") from the memory 94 and updates descriptor fields in the templates based on the command parameters in the one or more descriptor command signals and/or firmware descriptors. Each of the templates may be a generic descriptor and/or a flexible descriptor. A generic descriptor may have a predetermined set of parameter fields with predetermined default values in each of the parameter fields. A purpose of the generic descriptor may be fixed. A flexible descriptor refers to a descriptor for which parameter fields can be updated and/or used for different purposes. For example, fields of a flexible descriptor may be used to set different control parameters of a NVSM.

At 512, the descriptor generating module 103 stores the one or more templates as modified at 510 in the memory 94. The one or more templates as modified do not replace the corresponding one or more templates accessed at 510. This allows the same default templates and/or modified templates to be used for subsequently generated descriptors (hardware and/or firmware descriptors).

At 514, the descriptor generating module 103, for each of the firmware descriptors and according to the corresponding and modified template, generates one or more second descriptors (e.g., hardware descriptors). Multiple second descriptors may be generated for each of (i) the firmware descriptors generated by the NVSM control module 27, and/or (ii) corresponding and modified template. The second descriptors may include hardware and/or firmware descriptors. Examples of generating multiple hardware descriptors are described below with respect to the embodiments of FIGS. 13-14.

At 516, the descriptor generating module 103 stores the second descriptors generated at 514 in the memory 94. The second descriptors generated at 514 may be stored as part of or separate from a corresponding and modified template. At 518 and subsequent to generating and/or saving the second descriptors, the descriptor generating module 103 may indicate to the NVSM control module 27 that generation of the current one or more second descriptors is completed. The descriptor generating module 103 may provide this indication by: sending a status signal to the NVSM control module 27; setting a flag accessible to the NVSM control module 27 via, for example, the AHB bus 105; and/or by generating an interrupt. The status signal may be transmitted via the AHB bus 105.

At 520, the descriptor generating module 103 may determine whether there is another firmware descriptor generated by the NVSM control module 27 to convert to, for example, multiple hardware descriptors. If there is another firmware descriptor, task 508 may be performed, otherwise the method may end at 522.

Figure 12:
FIG. 12 illustrates an example of a status register according to the present disclosure.

During the above-described method, for example at 518, one or more status registers may be updated for each of the firmware descriptors generated, executed and/or converted to hardware descriptors. The descriptor generating module 103 may update the fields in the status registers during and/or subsequent to the descriptor generating module completing generation of one or more descriptors. The NVSM control module 27 may track these fields to determine whether firmware-to-hardware (or single-to-multiple) descriptor conversion has been executed and completed. FIG. 12 illustrates an example of a status register 530 that may be used for these tracking purposes.

The status register 530 shown includes four fields. The first field, identified as DGE_GENDES_CNT, indicates a number of descriptors (e.g., number of hardware and/or firmware descriptors) generated by the descriptor generating module 103 for a particular firmware descriptor. The second field, identified as DES_FIFO_ADDR, is an address pointer indicating an address in the memory 94 where the descriptors generated by the descriptor generating module 103 are stored. The third field, identified as DGE_ERR_CODE, indicates whether an error has occurred during the firmware-to-hardware and/or single-to-multiple descriptor conversion process. As an example, the third field may indicate when a parameter provided in a parameter row of a firmware descriptor is "out of boundary" meaning indiscernible by the descriptor generating module 103. The fourth field, identified as DES_FIFO_ADDR_WRAPPED, indicates whether a descriptor has wrapped a circular memory. For example, a buffer or FIFO register may be used as a circular memory such that upon filling the buffer or FIFO register remaining data is written over data at a beginning of the buffer or FIFO register. As a result, if a descriptor is larger than a buffer or FIFO register, a last portion of the descriptor may be written over a beginning portion of the descriptor in the buffer or FIFO register.

The above-described tasks of FIG. 9 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 13:
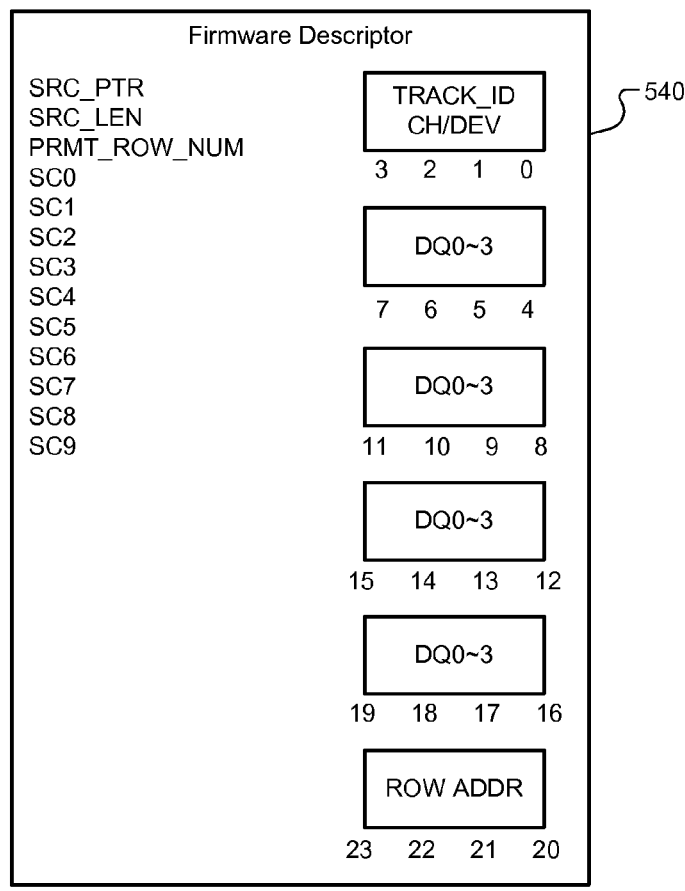
FIG. 13 illustrates an example of a firmware descriptor according to the present disclosure.

FIGS. 13 and 14 respectively illustrate an example of a firmware descriptor 540 and an example of a template 550. The firmware descriptor 540 may be generated by the NVSM control module 27 of FIG. 1. The firmware descriptor 540 and the template 550 may be stored in the memory 94 of FIG. 1. In the example shown, the firmware descriptor 540 is generated for a multi-level cell embodiment, where the cells of the NVSM 12 include triple-level cells (TLCs). Each of the TLCs may be able to store multiple bits of data.

In the example shown, the firmware descriptor 540 includes multiple fields, such as the fields SRC_PTR, SRC_LEN, PRMT_ROW_NUM. The firmware descriptor 540 may indicate which fields to include in the hardware (or second) descriptors generated by the descriptor generating module 103 of FIG. 1, such as the fields SC0, SC8, SC9, and SC5. The firmware descriptor 540 may include values for a channel and/or device identifier CH/DEV ID, a group command identifier TRACK_ID, a control parameter DQ0, and/or an address corresponding to the fields SC0, SC8, SC9, and SC5, as shown.

The firmware descriptor 540 may also include values to update corresponding descriptor values in the template 550. For example, bytes 0-3 of the firmware descriptor 540 correspond to the field SC8 of the template 550. As another example, the bytes 4-19 of the firmware descriptor 540 include values for fields DQ0-3 of the template 550. Values for the fields DQ0-3 may be provided for each of the first four descriptors in the template 550. The firmware descriptor 540 may also include bytes (e.g., bytes 20-23) having a start row address for field SC5.

As shown, the template 550 includes fields for each of 5 descriptors. The template 550 may include and number of fields for each descriptor and may have values for any number of descriptors. Also, any number of descriptors may be generated using the template 550 and/or values associated with a descriptor in the template 550. The number of descriptors generated based on the template 550 and/or a portion of the template 550 may be indicated via the fields SRC_PTR and SRC_LEN. The template 550 may be defined by a user, predetermined, and/or generated by the NVSM control module 27 and stored in the memory 94.

For a TLC read, up to four voltage reference (VREF) threshold adjustments for the NVSM 12 may be performed prior to issuing a read (or fifth) descriptor (e.g., DES5). For this reason, the template 550 may include descriptor values for the VREF adjustments. The descriptor values provided in the template 550 for the descriptors DES1-4 may be used respectively for the four VREF adjustments. The descriptor values DES1-4 may include a control parameter field SC9 with value DQ0, which may be used to indicate a respective VREF. In the example shown, control parameter fields DQ1-3 are not used. As an example, NVSM control module 27 may generate a firmware descriptor with a VREF adjustment values for respective upper, middle, and lower bits of memory cells. The VREF adjustment values may provide thresholds for determining states of the memory cells. In a two bit per memory cell example, the VREF adjustment values may provide thresholds for memory cell states 00, 01, 10, 11. The thresholds are used to distinguish between detected voltages corresponding to states of the memory cells to determine bit values of the memory cells.

The descriptors generated based on the template 550 may be generic and/or flexible descriptors. Each of the descriptors may include source control fields SRC_CTRL, such as the fields SC0, SC8, SC9, and SC5, as shown. The SC0 field may indicate, as described above, a channel CH and/or a device DEV. The SC8 field may indicate, as described above, a group command (or track) identifier. The SC5 field may indicate a start row address START_ROW_ADDR where data is stored in the NVSM 12. The values in the fields SC0, SC8, SC9, SC5 of the descriptor values DES1-5 are input parameter index values, which may be obtained from the firmware descriptor and may replace corresponding values in the template. For example, if the field DQ0 is equal to 4 as indicated by the first descriptor value DES1, then the fields DQ0-3 for the first descriptor values DES1 are replaced by input parameter bytes 4-7.

The descriptor generating module 103 generates the five descriptors based on the descriptor values DES1-5 provided in the template 550 and input command parameters in the firmware descriptor 540, such as the input command parameters stored in bytes 4-19. In the example shown, the VREFs stored in bytes 4-19 are input command parameters. Other input command parameters (examples of which are disclosed above) may be provided via the firmware descriptor 540 and updated in the template 550.

The disclosed embodiments allow for templates and/or descriptors to be reused. As an example, to reuse the fourth descriptor values DES4, the NVSM control module 27 may set the field SCR_PTR to point to the fourth descriptor values DES4 and set the field SRC_LEN=2. This may be done to generate two descriptors using the same values in the same template 550.

Figure 15:
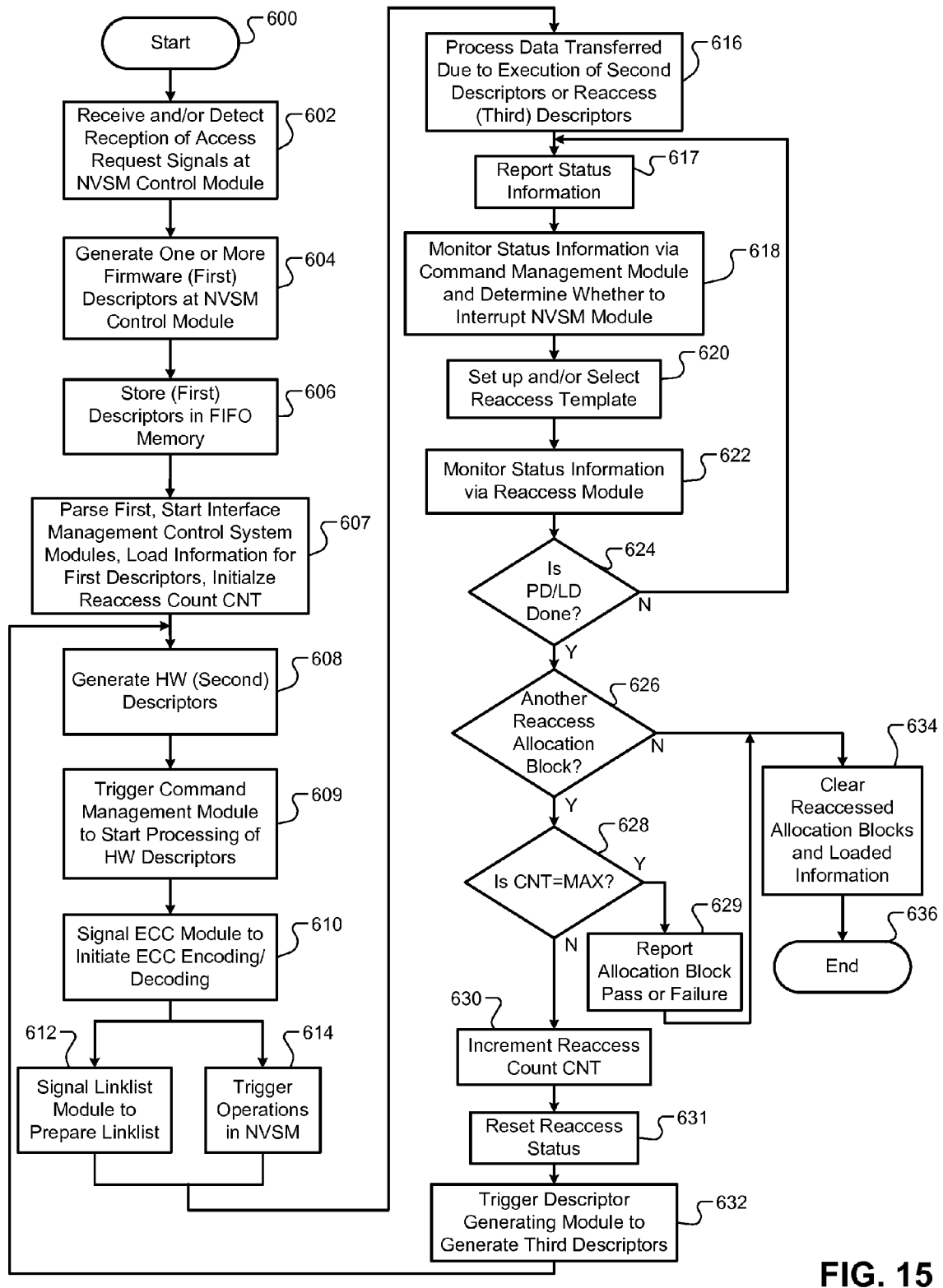
FIG. 15 illustrates a method of performing a reaccess process according to the present disclosure.

FIG. 15 illustrates a reaccess method. Although the tasks of FIG. 15 are primarily described with respect to the example of FIG. 1, the tasks may be applied to other embodiments of the present disclosure. The tasks of may be iteratively performed. Also, although the above-described tasks are primarily described with respect to reading data from the NVSM, the tasks may be modified to write and/or rewrite data to the NVSM.

The method may begin at 600. At 602, the NVSM control module 27 receives and/or detects reception of access request signals from the host device 13. At 604, the NVSM control module 27, using the firmware 92, generates one or more firmware (or first) descriptors based on the access request signals. The firmware descriptors may be generated to read data from or write data to the NVSM 12. At 606, the NVSM control module 27 sends the firmware descriptors to the memory 94 and/or the descriptor generating module 103 and/or descriptor command signals to the descriptor generating module 103. The firmware descriptors may be provided directly to the descriptor generating module 103 or may be provided indirectly to the descriptor generating module 103 via the command management module 60. The descriptor command signals and/or the firmware descriptors may be used to trigger the command management module 60 to initiate descriptor processing and enable, for example, modules 11, 48, 50, 103 and 107. The storing and/or transfer of the firmware descriptors may trigger the command management module 60. Tasks 602-606 may be similar to tasks 502-506 described above with respect to FIG. 9.

At 607, the command management module 60 may parse the firmware descriptors and enable the modules 11, 48, 50, 103 and 107 of the interface management control system 26. The command management module 60 may enable the modules 11, 48, 50, 103 and 107, as follows. The command management module 60 may send a descriptor type bit HW_RRD to the interface management module 50 to indicate that a firmware descriptor is being transferred as opposed to a hardware or reaccess descriptor. For this reason, the command management module 60 does not trigger the linklist module 107 for reaccess descriptors. The descriptor type bit HW_RRD indicates the type of descriptor (e.g., firmware, hardware, or reaccess) being provided. This indicates to the interface management module 50 where to send a response signal with status information as described below at task 617. The ECC module 48 fetches, based on an allocation block ID from the command management module 60, linklists from the memory 94.

The command management module 60, for the firmware descriptors and purposes of loading information, identifies new allocation blocks to monitor and initializes a reacccess count CNT for each of the allocation blocks and/or group of allocation blocks. The reaccess count CNT may be set equal to zero. The loaded information may include default templates, reaccess templates, control information, or other information pertaining to the execution of the firmware descriptors and the transfer of corresponding data. The reaccess count may be used by the reaccess module 11 to identify a current reaccess event.

At 608, the descriptor generating module 103 generates hardware (or second descriptors) as described above in tasks 510-518 of FIG. 5 or generates reaccess descriptors (third descriptors) depending on whether one or more reaccess events are to be performed. The second descriptors are generated if a first access event is to be performed and/or a reaccess event is not to be performed. The second descriptors are not reaccess descriptors. The descriptor generating module 103 generates the third descriptors when a reaccess event is to be performed. The third descriptors are generated for one or more pages and/or one or more allocation blocks. A reaccess descriptor FIFO pointer may be moved to a next descriptor to be executed prior to task 609.

At 609, the NVSM control module 27 and/or the descriptor generating module 103 triggers the command management module 60 to start processing of hardware descriptors or the reaccess descriptors. The command management module 60 receives the second descriptors or the third descriptors and checks availability of: data for a program (or write) operation; or space availability for a read operation. Space availability may refer to space available in FIFOs of the interface management module 50. As shown above, the command management module 60 can receive commands (e.g., firmware descriptors, hardware descriptors and, as described further below, reaccess descriptors) from the NVSM control module 27 and the descriptor generating module 103.

At 610, the command management module 60 sends a start signal AU_START to the ECC module 48 to initiate ECC encoding and/or decoding. At 612, the command management module 60 sends a request signal FLC_REQ to the linklist module 107 to prepare a linklist for one or more allocation blocks. The linklist module 107 may be provided with and/or may access information to prepare the linklist. The information may be provided by the command management module 60 and may include addresses, allocation block formats, and a number of allocation blocks per page. At 614, the command management module 60 while sending the request signal FLC_REQ may also send a second trigger signal SET_DES to the interface management module 50 to trigger corresponding operations of the NVSM 12. Tasks 614 may be performed while performing task 612.

At 616, subsequent to completing execution of the second descriptors or the third descriptors, the interface management module 50 and/or the ECC module 48 (i) process data transferred due to the execution of the second descriptors or the third descriptors, and (ii) generate status information (e.g., descriptor ID, NVSM parameter updates, and error information) for each of the allocation blocks and/or groups of allocation blocks transferred. As an example, the parameter updates may include voltage reference Vref changes or other NVSM control information changes. The parameter changes may be indicated by the interface management module 50. The error information may indicate the type of error, the number of errors, whether there is an error, and/or whether no error exists. The error information may indicate that execution of a descriptor is completed and no error exists. The error information may be indicated via the interface management module 50 and/or the ECC module 48.

At 617, status information is reported. The interface management module 50 and the ECC module 48 reports status information to the reaccess module 11, the NVSM control module 27, and/or the command management module 60. The interface management module 50 may report status information to and the reaccess module 11, the ECC module 48, and/or the command management module 60. The status information may be based on the descriptor type bit HW_RRD and include descriptor status information and current states of control parameters, such as current states of the voltage references Vrefs. The descriptor status information may include information pertaining to hardware descriptors and/or reaccess descriptors executed. This may include, for a current access event: descriptor IDs; allocation block IDs; an indication of whether execution of each of the descriptors is completed; indications of whether there are any errors associated with executing each of the descriptors; and/or indications of whether there are any errors associated with data transferred as a result of executing the descriptors.

The ECC module 48 may provide status updates and/or corresponding signals for each allocation block or group of allocation blocks. The status updates and/or corresponding signals may include a data error update AU_FAIL, an allocation block transfer update AU_DONE, and a first reaccess signal REACCESS1. The ECC module 48 may report a first reaccess signal REACCESS1 to the reaccess module 11 to trigger a reaccess event if conditions for performing a reaccess event have been satisfied and a maximum number of reaccess events for the one or more allocation blocks has not been exceeded. A reaccess information FIFO 109 in the memory 94 may store an indication of whether a reaccess event is to be performed. The data error update AU_FAIL indicates whether there is an error associated with the data transferred. The error may have occurred during accessing of the NVSM 12 and/or during the encoding or decoding performed in the ECC module 48. The allocation block transfer update AU_DONE indicates whether the transfer of the allocation blocks is completed and/or whether the ECC module 48 is done processing and transferring the allocation blocks.

The reaccess module 11 may send a reaccess status update to the status FIFOs 110 after a reaccess event is done. The NVSM control module 27, via the firmware 92, may check the reaccess status stored in the status FIFOs 110.

At 618, the command management module 60 monitors and stores the status information generated by the ECC module 48 and/or interface management module 50 into status FIFOs 110 in the memory 94. The command management module 60 may monitor the status FIFOs 110 and interrupt the NVSM control module 27 when certain conditions exist (e.g., generation and/or execution of one or more hardware descriptors is completed, one or more allocation block errors have been detected, etc.). The interrupt may be based on the status information received from the interface management module 50 at 110. The command management module 60 may send a second reaccess signal REACCESS2 to the reaccess module 11 and/or the ECC module 48 indicating whether a reaccess event is to be performed for one or more allocation blocks. The second reaccess signal REACCESS2 may be based on a control signal from the NVSM control module 27.

At 620, the NVSM control module 27, while executing the firmware 92, may set up, select, and/or change reaccess templates, which may be stored as part of the templates 106 in the memory 94. The reaccess templates may be the same as, similar to, or different than the templates (e.g., templates described with respect to the method of FIG. 9) used to generate the hardware descriptors. A different reaccess template may be used for each successive reaccess event associated with one or more memory cells and/or one or more addresses in the NVSM 12. As an example, if the maximum number of reaccess attempts is 4, then 4 different templates may be used, one template for each reaccess attempt. As an alternative the NVSM control module 27 and/or the descriptor generating module 103 may adjust the same template between reaccess events. The use and/or adjustment of the templates increases the potential of correcting errors. Parameters of the templates used for the reaccess events may be different and/or adjusted. For example, the above-described control parameters, provided in corresponding descriptors and templates such as the voltage references Vrefs may be different and/or adjusted to better determine states of memory cells. The parameters of the reaccess templates may be updated based on the status information.

The templates used for successive reaccess events associated with the same memory cells and/or addresses of the NVSM 12 is referred to as a group of templates. Each group of templates may be associated with a flow of descriptors and corresponding data. As an example, a predetermined number (e.g., 16) of flows of descriptors and corresponding data may be executed and transferred in parallel.

Although task 620 is shown as being performed subsequent to task 618 and in response to the status information, task 620 may be performed prior to task 618 and may not be performed based on the status information. For example, task 620 may be performed at 604 and/or the reaccess templates may be predetermined and stored in memory.

At 622, the reaccess module 11 monitors the status information. Task 622 may be performed while tasks 618, 620 are performed. Task 622 may be performed subsequent to ECC module 48 and the interface management module 50 updating the status information.

At 624, the reaccess module 11 determines: (i) whether the ECC module 48 (identified as the logical domain) is done processing the allocation blocks, and (ii) whether the interface management module 50 (identified as the physical domain) is done executing the hardware and/or reaccess descriptors. If the logical and physical domains are done, task 626 is performed, otherwise one or more of tasks 617-622 is performed.

At 626, the reaccess module 11 determines whether there is one or more allocation blocks to be reaccessed and/or whether there are one or more reaccess events to be performed. Task 628 is performed when there are one or more reaccess events to be performed, otherwise task 634 is performed.

At 628, the reaccess module 11 determines whether the reaccess count CNT is greater than the maximum number of permitted reaccess events for the corresponding allocation blocks. If the reaccess count CNT is greater than the maximum number, task 634 may be performed, otherwise task 629 is performed.

The allocation block IDs, the reaccess count, and the maximum number may be stored in the reaccess information FIFO 109 and accessed and updated by the reaccess module 11. The ECC module 48 may also access the reaccess information FIFO 109 to determine whether the allocation blocks have passed (i.e. no reaccess event to be performed) or failed (i.e. conditions satisfy performing a reaccess event). The reaccess module 11 may perform up to the maximum number of reaccess events for each allocation block and/or group of allocation blocks. If after the maximum number of reaccess events the corresponding allocation blocks and/or group of allocation blocks still have corresponding errors justifying that a reaccess event be performed, the reaccess module 11 may report to the ECC module 48 the status of the allocation blocks as failed. The ECC module 48 may determine this status by accessing the reaccess information FIFO 109 and indicate a pass or a failure at 629. Task 634 may be performed subsequent to task 629.

At 630, the reaccess module 11, increments the reaccess count CNT. At 631, status values, for each of the allocation blocks to be transferred again during a reaccess event, may be reset. This allows the status values to be set during the next reaccess events.

At 632, the reaccess module 11, based on the status information, triggers the descriptor generating module 103 to generate reaccess descriptors (e.g., reread descriptors or rewrite descriptors). The reaccess descriptors are for the allocation blocks for which a reaccess event is to be performed. Task 608 may be performed subsequent to task 632.

At 634, if a reaccess event is not to be performed, allocation blocks and/or the corresponding information loaded in the reaccess module 11 is cleared. The method may end at 636.

The above-described tasks of FIG. 15 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Because there are numerous implementations of the present disclosure, the arrangements do not explicitly show all of the implementations. For example, the adjacent and non-adjacent elements shown in, for example, FIGS. 1-5 may be directly or indirectly connected to each other. The adjacent and non-adjacent elements may wirelessly communicate with each other and/or may communicate with each other via wired links. The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

Although the terms first, second, third, etc. may be used herein to describe various elements, components, channels, modules, and/or devices, these elements, components, channels, modules, and/or devices should not be limited by these terms. These terms may be only used to distinguish one elements, components, channels, modules, and/or devices from another elements, components, channels, modules, and/or devices. Terms such as "first," "second," and other numerical terms when used herein do not imply a sequence or order unless clearly indicated by the context. Thus, a first elements, components, channels, modules, and/or devices discussed below could be termed a second elements, components, channels, modules, and/or devices without departing from the teachings of the example embodiments.

What is claimed is:

1. A storage drive comprising:
   a first module configured to, based on an instruction signal of a first descriptor, transfer a block of data to or from a non-volatile semiconductor memory in the storage drive; and
   a second module configured to
      monitor a status of the transfer of the block of data,
      determine whether an error exists with respect to the transfer of the block of data, and
      independent of communication with a host device, initiate generation of a second descriptor if the error exists,
   wherein the second module is configured to, according to the second descriptor, perform a reaccess event including reaccessing the non-volatile semiconductor memory to again transfer the block of data to or from the non-volatile semiconductor memory.

2. The storage drive of claim 1, further comprising:
   a third module configured to control transfer of the block of data between the host device and the storage drive,
   wherein the first module is configured to transfer the block of data between the third module and the non-volatile semiconductor memory;
   a fourth module configured to generate the first descriptor to transfer the block of data between the first module and the non-volatile semiconductor memory; and
   a fifth module configured to generate the instruction signal based on the first descriptor,
   wherein the first module, when performing the reaccess event, reaccesses the non-volatile semiconductor memory to again transfer the block of data between the third module and the non-volatile semiconductor memory.

3. The storage drive of claim 1, further comprising:
   a third module configured to, according to the first descriptor, generate a third descriptor to transfer the block of data between the first module and the non-volatile semiconductor memory; and
   a fourth module configured to generate the instruction signal in response to the second descriptor,
   wherein the second module configured to, based on execution of the third descriptor by the first module, monitor the status of the transfer of the block of data, determine whether the error exists with respect to the transfer of the block of data, and initiate the generation of the second descriptor if the error exists.

4. The storage drive of claim 3, wherein the third module is configured to:
   access a template;
   update fields in the template based on a plurality of parameters in the first descriptor; and
   generate the second descriptor or the third descriptor according to the template.

5. The storage drive of claim 4, wherein:
   the template is a first template; and
   the third module is configured to access the first template to generate the second descriptor and access a second template to generate the third descriptor.

6. The storage drive of claim 4, further comprising a fifth module sets values of the plurality of parameters based on status information for the block of data.

7. The storage drive of claim 3, wherein:
the second module is configured to trigger the third module to generate a plurality of reaccess descriptors corresponding respectively to a plurality of reaccess events for the block of data;
the plurality of reaccess descriptors includes the second descriptor;
the third module is configured to
access a template for each of the plurality of reaccess events, wherein each of the templates comprises a plurality of fields,
update the plurality of fields in the templates based on the first descriptor; and
generate the plurality of reaccess descriptors according to the templates.

8. The storage drive of claim 1, further comprising:
a third module configured to process data transferred between the first module and the non-volatile semiconductor memory and generate an indication signal if the error exists,
wherein the second module is configured to, based on the indication signal, generate a trigger signal to trigger the generation of the second descriptor; and
a fourth module configured to generate the second descriptor based on the trigger signal.

9. The storage drive of claim 1, further comprising a third module is configured to set a maximum number of reaccess events for the block of data, wherein:
the second module is configured to track a number of reaccess events performed for the block of data, trigger generation of a plurality of reaccess descriptors corresponding respectively to the reaccess events performed for the block of data, and cease generation of reaccess descriptors if the number of reaccess events is equal to or greater than the maximum number of reaccess events; and
one of the plurality of reaccess descriptors generated for the reaccess events is the second descriptor.

10. The storage drive of claim 9, wherein the second module is configured to report:
a pass for the block of data if the error no longer exists as a result of one of the reaccess events performed for the block of data clearing the error; and
a pass or a failure for the block of data if the number of reaccess events performed for the block of data is equal to or greater than the maximum number of reaccess events.

11. The storage drive of claim 1, further comprising:
a third module,
wherein the block of data is a first block of data;
a fourth module configured to control transfer of a plurality of blocks of data between the host device and the storage drive,
wherein the plurality of blocks of data include the first block of data, and
wherein the first module is configured to transfer the plurality of blocks of data to and from the non-volatile semiconductor memory in the storage drive; and
a fifth module configured to generate the first descriptor to transfer the plurality of blocks of data between the second module and the non-volatile semiconductor memory,
wherein the third module is configured to, according to the first descriptor, generate a plurality of third descriptors, wherein each of the plurality of third descriptors corresponds to a respective one of the plurality of blocks of data, and
wherein the second module is configured to, based on the third descriptors, transfer the plurality of blocks of data between the second module and the non-volatile semiconductor memory.

12. A method comprising:
based on an instruction signal of a first descriptor, transferring a block of data to or from a non-volatile semiconductor memory in a storage drive;
monitoring a status of the transfer of the block of data;
determining whether an error exists with respect to the transfer of the block of data;
independent of communication with a host device, initiating generation of a second descriptor if the error exists; and
according to the second descriptor, performing a reaccess event including reaccessing the non-volatile semiconductor memory to again transfer the block of data to or from the non-volatile semiconductor memory.

13. The method of claim 12, further comprising:
controlling transfer of the block of data between the host device and the storage drive;
generating the first descriptor to transfer the block of data to or from the non-volatile semiconductor memory; and
generating the instruction signal based on the first descriptor.

14. The method of claim 12, further comprising according to the first descriptor, generating a third descriptor to transfer the block of data to or from the non-volatile semiconductor memory, wherein:
the instruction signal is generated in response to the second descriptor; and
based on execution of the third descriptor,
the status of the transfer of the block of data is monitored,
the determination of whether the error exists with respect to the transfer of the block of data is performed, and
the generation of the second descriptor is initiated if the error exists.

15. The method of claim 14, further comprising:
accessing a template;
updating fields in the template based on a plurality of parameters in the first descriptor; and
generating the second descriptor or the third descriptor according to the template.

16. The method of claim 15, wherein:
the template is a first template;
the first template is accessed to generate the second descriptor; and
a second template is accessed to generate the third descriptor.

17. The method of claim 15, further comprising setting values of the plurality of parameters based on status information for the block of data.

18. The method of claim 14, further comprising:
triggering generation of a plurality of reaccess descriptors corresponding respectively to a plurality of reaccess events for the block of data, wherein the plurality of reaccess descriptors includes the second descriptor;
accessing a template for each of the plurality of reaccess events, wherein each of the templates comprises a plurality of fields;
updating the plurality of fields in the templates based on the first descriptor; and generating the plurality of reaccess descriptors according to the templates.

19. The method of claim 12, further comprising:

processing data transferred to or from the non-volatile semiconductor memory;

generating an indication signal if the error exists;

based on the indication signal, generating a trigger signal to trigger the generation of the second descriptor; and generating the second descriptor based on the trigger signal.

20. The method of claim 12, further comprising:

setting a maximum number of reaccess events for the block of data;

tracking a number of reaccess events performed for the block of data;

triggering generation of a plurality of reaccess descriptors corresponding respectively to the reaccess events performed for the block of data, wherein one of the plurality of reaccess descriptors generated for the reaccess events is the second descriptor; and ceasing generation of reaccess descriptors if the number of reaccess events is equal to or greater than the maximum number of reaccess events.

21. The method of claim 20, further comprising reporting:

a pass for the block of data if the error no longer exists as a result of one of the reaccess events performed for the block of data clearing the error; and a pass or a failure for the block of data if the number of reaccess events performed for the block of data is equal to or greater than the maximum number of reaccess events.

22. The method of claim 12, wherein:

the block of data is a first block of data; and the method further comprises transferring a plurality of blocks of data between the host device and the storage drive, wherein the plurality of blocks of data include the first block of data, transferring the plurality of blocks of data to or from the non-volatile semiconductor memory in the storage drive, generating the first descriptor to transfer the plurality of blocks of data to or from the non-volatile semiconductor memory, according to the first descriptor, generating a plurality of third descriptors, wherein each of the plurality of third descriptors corresponds to a respective one of the plurality of blocks of data, and based on the third descriptors, transferring the plurality of blocks of data to or from the non-volatile semiconductor memory.

* * * * *